US009179363B2

(12) United States Patent
Siomina et al.

(10) Patent No.: US 9,179,363 B2
(45) Date of Patent: Nov. 3, 2015

(54) SYSTEMS AND METHODS FOR DETERMINING A COUPLING CHARACTERISTIC IN A RADIO COMMUNICATIONS NETWORK

(75) Inventors: Iana Siomina, Solna (SE); Di Yuan, Norrkoping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 372 days.

(21) Appl. No.: 13/495,612

(22) Filed: Jun. 13, 2012

(65) Prior Publication Data

US 2013/0040683 A1 Feb. 14, 2013

Related U.S. Application Data

(60) Provisional application No. 61/522,755, filed on Aug. 12, 2011.

(51) Int. Cl.
*H04W 28/08* (2009.01)
*H04W 16/14* (2009.01)
(Continued)

(52) U.S. Cl.
CPC .......... *H04W 28/08* (2013.01); *H04W 28/0236* (2013.01); *H04W 16/08* (2013.01); *H04W 16/14* (2013.01); *H04W 28/0268* (2013.01); *H04W 28/16* (2013.01); *H04W 36/22* (2013.01)

(58) Field of Classification Search
CPC ............ H04W 52/243; H04W 52/244; H04W 72/082; H04W 92/20; H04W 24/02; H04W 72/0426; H04W 16/08; H04W 36/30; H04W 72/08; H04W 72/085; H04W 36/22; H04W 24/08; H04W 28/08; H04W 36/08; H04W 36/20; H04W 72/04; H04W 28/0289; H04W 28/16; H04W 40/12; H04W 72/12; H04W 28/0268; H04W 28/0236; H04W 16/14; H04W 72/1231; H04B 17/005; H04B 17/0057; H04B 17/0042
USPC .................................. 455/63.1; 370/254, 255
See application file for complete search history.

(56) References Cited

U.S. PATENT DOCUMENTS

2003/0003906 A1* 1/2003 Demers et al. ................ 455/424
2004/0127259 A1* 7/2004 Matsunaga .................... 455/560
(Continued)

OTHER PUBLICATIONS

Measure—Wiktionary, located at en.wiktionary .org/wiki/measure, retrieved on Nov. 10, 2014.*
(Continued)

*Primary Examiner* — Gennadiy Tsvey
(74) *Attorney, Agent, or Firm* — Rothwell, Figg, Ernst & Manbeck, P.C.

(57) ABSTRACT

A method is disclosed for using cell load coupling (CLC) to manage a radio communications network (RCN), comprising cells and radio network nodes associated with the cells. The method comprises determining a CLC characteristic between a first and second of the cells. The determining is based on a cell load contribution that is dependent on a measure of: signal received by a receiving node of the first cell from a transmitting node of the first cell, a signal received by the receiving node from a transmitting node of the second cell, and traffic between the receiving node and the transmitting node of the first cell. One or more network management functions may be performed on the RCN based on the determined CLC characteristics. The method and/or the functions may be implemented by a computer program, a wireless communications device or a network node.

31 Claims, 7 Drawing Sheets

(51) Int. Cl.
*H04W 28/02* (2009.01)
*H04W 16/08* (2009.01)
*H04W 28/16* (2009.01)
*H04W 36/22* (2009.01)

(56) References Cited

U.S. PATENT DOCUMENTS

| 2008/0009244 | A1* | 1/2008 | Lee | 455/69 |
| 2009/0141661 | A1* | 6/2009 | Li et al. | 370/311 |
| 2009/0168687 | A1* | 7/2009 | Li et al. | 370/315 |
| 2010/0067375 | A1* | 3/2010 | Ianev | 370/230 |
| 2012/0149413 | A1* | 6/2012 | Pedersen | 455/501 |

OTHER PUBLICATIONS

Measurement—Wiktionary, located at en.wiktionary.org/wiki/measurement, retrieved on Nov. 10, 2014.*
Kim et al., "alpha-Optimal User Association and Cell Load Balancing in Wireless Networks", 2010 Proceedings IEEE INFOCOM, Mar. 14, 2010, 5 pages XP031742883.
Lobinger et al., "Load Balancing in Downlink LTE Self-Optimizing Networks", 2010 IEEE Vehicular Technology Conference (VTC 2010-Spring), May 16, 2010, 5 pages XP031695881.
Majewski et al., "Conservative Cell Load Approximation for Radio Networks with Shannon Channels and its Application to LTE Network Planning", 2010 Sixth Advanced International Conference on Telecommunications (AICT), IEEE, May 9, 2010, 7 pages XP031693141.
Majewski et al., "Analytic uplink cell load approximation for planning fractional power control in LTE networks", Telecommunications Network Strategy and Planning Symposium (Networks), 2010 14th International, IEEE, Sep. 27, 2010, 7 pages XP031792497.
He et al., "An Optimal Approach for Load Balancing in Heterogeneous LTE Advanced", Third Nordic Workshop on System & Network Optimization for Wireless, SNOW 2012, Apr. 11, 2012, 1 page XP055048914.
Siomina et al., "Analysis of Cell Load Coupling for LTE Network Planning and Optimization", Ericsson Research, Jan. 19, 2012, URL: http://arxiv.org/pdf/1201.4116v1/, 22 pages XP055048908.
Siomina et al., "Load Balancing in Heterogeneous LTE: Range Optimization via Cell Offset and Load-Coupling Characterization", 2012 IEEE International Conference on Communications (ICC), Jun. 10, 2012, 5 pages XP032273902.
Siomina et al., "A Mathematical Framework for Statistical QoS and Capacity Studies in OFDM Networks", IEEE 20th International Symposium on Personal, Indoor and Mobile Radio Communications (PIMRC 2009), IEEE, Sep. 13, 2009, 5 pages XP031660088.
Viering et al., "A mathematical perspective of self-optimizing wireless networks", IEEE International Conference on Communications 2009, IEEE, Jun. 14, 2009, 6 pages XP031505602.
International Search Report and Written Opinion from PCT/IB2012/054074; dated Jan. 16, 2013, 16 pages.

* cited by examiner

SYSTEMS AND METHODS FOR DETERMINING A COUPLING CHARACTERISTIC IN A RADIO COMMUNICATIONS NETWORK

CROSS-REFERENCE TO RELATED APPLICATIONS

This application claims the benefit of U.S. Provisional Application No. 61/522,755, filed Aug. 12, 2011, which is fully incorporated herein by reference.

TECHNICAL FIELD

This disclosure relates to wireless networks and in particular networks that implement radio resource control for various purposes.

BACKGROUND

Radio resources are scarce and their utilization is typically controlled at multiple levels of different radio network phases, such as network dimensioning (i.e., where a rough estimation of radio resource utilization is performed), detailed static network planning, network self optimization, and dynamic radio resource control functions (e.g., admission and congestion control, scheduling, and load balancing).

Balancing radio resource utilization and ensuring that a required service quality is met have always been an important consideration for wireless networks. This consideration is becoming even more crucial as traffic demand grows and various types of radio technologies must co-exist. Existing radio resources (e.g. frequency spectrum) are limited and expensive and so efficient utilization of such resources is crucial. Furthermore, increasing diversity in radio devices and radio nodes of various capabilities may require more sophisticated algorithms for evaluating resource consumption and controlling the resources utilization.

Efficient radio resource control becomes particularly challenging in heterogeneous networks where the neighbor cell sizes and capacity as well as the traffic demand may vary significantly.

Planning and optimization of wireless networks (e.g., an LTE deployment), may include managing base station location and antenna parameter configuration and algorithmic approaches for network-level performance evaluation. Finding the optimal network design and configuration requires solving a combinatorial optimization problem. To select among candidate configuration solutions, it is essential to develop system modeling techniques that enable rapid performance assessment of different configurations.

In Universal Mobile Telecommunications System (UMTS), the system modeling has been primarily based on power control, where the transmit power of each link is adjusted to meet a given signal-to-interference-and-noise ratio (SINR) threshold. By the SINR requirement, the power expenditure of one cell is a linear function in those of the other cells. As a result, the power control mechanism is represented by a system of linear equations, which is sometimes referred to as UMTS interference coupling.

An alternative approach to the power-control model is the rate-control scheme, which takes into account the traffic demand which exhibits a nonlinear relation and is thus more complex. In this scheme, the performance target is not SINR, but the amount of data to be served over a given time period. Among other advantages, this approach makes it possible to capture the effect of scheduling without the need of explicitly modeling full details of scheduling algorithms. The rate-control-based approach also allows for modeling the system behavior of non-power-controlled systems (e.g., LTE downlink). A general formulation of such a system model has been originally provided in I. Siomina, A. Furuskär and G. Fodor, "A mathematical framework for statistical QoS and capacity studies in OFDM networks," Proceedings of IEEE PIMRC '09, September 2009, pp. 2772-2776, which is incorporated by reference herein in its entirety.

Radio network planning and optimization may be performed by specialized programs that may use radio characteristics of the target radio environment as input. Such characteristics may be collected by means of drive tests or simulated propagation modeling. Radio network planning and optimization may also be automated and implemented in the network itself (e.g., as a part of operations and maintenance (O&M) and/or self-organizing network (SON)).

Radio resource management (RRM) is a set of functionalities that allow for automatically controlling and balancing radio resource utilization among different cells of a network during the network operation. The goal of RRM algorithms is to maximize radio resource utilization efficiency and ensure the requested service quality. Specialized programs may be configured to perform automated RRM algorithms using radio characteristics of the target radio environment as input (e.g., collected via drive tests or simulated propagation modeling). RRM may be intra-frequency, inter-frequency or inter-RAT.

Some examples of RRM functions include radio bearer control (RBC), radio admission/congestion control, connection mobility control, dynamic resource allocation and packet scheduling, inter-cell interference coordination, load balancing, and others.

RBC:

The establishment, maintenance, and release of Radio Bearers involve the configuration of radio resources associated with them. When setting up a radio bearer for a service, RBC may take into account the overall resource situation in E-UTRAN, the QoS requirements of in-progress sessions, and the QoS requirement for the new service. RBC is also concerned with the maintenance of radio bearers of in-progress sessions at the change of the radio resource situation due to mobility or other reasons. RBC is involved in the release of radio resources associated with radio bearers at session termination, handover or at other occasions.

Radio Admission Control/Congestion Control:

The purpose of admission control is to determine if the requested resources are available and to reserve those resources (e.g., admit or reject the establishment requests for new radio bearers). To do this, radio admission control may consider the overall resource situation in E-UTRAN, the QoS requirements, the priority levels and the provided QoS of in-progress sessions, and the QoS requirement of the new radio bearer request. The goal of radio admission control is to ensure high radio resource utilization (by accepting radio bearer requests as long as radio resources are available) and at the same time to ensure proper QoS for in-progress sessions (by rejecting radio bearer requests when they cannot be accommodated). Admission control thus addresses the trade-off between blocking newly arriving service requests and dropping on-going services for which either the requested QoS cannot be ensured or which consume a lot of radio resources and/or have a lower priority.

Connection Mobility Control:

Connection mobility control is concerned with the management of radio resources in connection with idle or connected mode mobility. In idle mode, the cell reselection algorithms are controlled by setting parameters (e.g., thresholds and hysteresis values) that define the best cell and/or determine when the UE should select a new cell. Also, E-UTRAN broadcasts parameters that configure the UE measurement and reporting procedures. In connected mode, the mobility of radio connections has to be supported. Handover decisions may be based on UE and eNodeB measurements. In addition, handover decisions may take other inputs, such as neighbor cell load, traffic distribution, transport and hardware resources, and Operator defined policies into account.

Dynamic Resource Allocation and Packet Scheduling:

The goal of dynamic resource allocation or packet scheduling is to allocate and de-allocate resources (including buffer and processing resources and resource blocks) to user and control plane packets. Dynamic resource allocation may involve several sub-tasks, such as selecting radio bearers whose packets are to be scheduled and managing the necessary resources (e.g. the power levels or the specific resource blocks used). Packet scheduling typically takes into account the QoS requirements associated with the radio bearers, the channel quality information for UEs, buffer status, interference situation, etc. Dynamic resource allocation may also take into account restrictions or preferences on some of the available resource blocks or resource block sets due to inter-cell interference coordination considerations.

Inter-Cell Interference Coordination:

Inter-cell interference coordination (ICIC) is aimed at managing radio resources such that inter-cell interference is kept under control. The ICIC mechanism includes a frequency domain component and a time domain component. ICIC is inherently a multi-cell RRM function that needs to take into account information (e.g. the resource usage status and traffic load situation) from multiple cells. The preferred ICIC method may be different in the uplink and downlink. The frequency domain ICIC manages radio resource, notably the radio resource blocks, such that multiple cells coordinate the use of frequency domain resources. For the time domain ICIC, subframe utilization across different cells are coordinated in time through backhaul signaling or O&M configuration of so called Almost Blank Subframe patterns. Enhanced ICIC techniques are particularly crucial for heterogeneous networks where the cell assignment rule may diverge from the RSRP-based approach. For example, the divergence may be towards a pathloss- or pathgain-based approach (e.g., by means of cell range expansion when e.g. a cell may still be selected as a serving cell when its RSRP is up to $\Delta$dB lower than the RSRP of the current serving cell). Cell range expansion is a concept that may be exercised for cells with a transmit power lower than neighbor cells, to make it possible increasing the cell coverage of low-power nodes.

Load Balancing:

Load balancing is aimed at handling uneven distribution of the traffic load over multiple cells. The purpose of load balancing is therefore to influence the load distribution in such a manner that radio resources remain highly utilized, the QoS of in-progress sessions are maintained to the extent possible, and call dropping probabilities are kept sufficiently small. Load balancing algorithms may result in handover (e.g., intra-frequency, inter-frequency, inter-RAT) or cell reselection decisions (e.g., related to frequency or carrier, RAT, reselection threshold or other reselection parameters configured by the network) aimed at redistributing traffic from highly loaded cells to underutilized cells.

In LTE, RRM functions such as those discussed above, are typically performed by an eNodeB. However, the decisions may be made via a centralized architecture (e.g., via O&M) or decentralized architecture (e.g., involving X2 interface in LTE and UE history information). There may also be semi-centralized architecture, where some of the RRM-related decisions, at least in part, are centralized and some are distributed among the radio nodes.

In performing various RRM functions, such as those described above, the system may need to perform various network management actions, such as bearer establishing/configuration/re-configuration/rejecting/dropping, handover (e.g., intra-frequency, inter-frequency, inter-RAT), parameter optimization (e.g., modify parameters related to scheduling bandwidth, transmit power level, cell selection/reselection received signal strength or quality thresholds, cell range offsets for evaluating candidates for cell reselection, other parameters used by different triggers, etc.). Such actions may be based on different parameters, such as requested and/or estimated current QoS, predicted QoS for a requested service and/or for in-service bearers, estimated current or predicted radio resource utilization (e.g., bandwidth utilization or RB utilization, average transmit power, cell load), with single or multi-RAT, estimated or configured capacity (or capacity region) or the maximum acceptable radio resource utilization, with single- or multi-RAT, and/or on other parameters.

Cell load is one of the classic measures of resource utilization in a cell and, in practice, it depends on traffic intensity and interference in the entire network. Estimating the cell load and optimizing load sharing among neighbor cells is therefore an important but challenging element of RRM algorithms. In LTE, cell load is typically associated with RB utilization, while in UMTS, cell load is typically associated with the total transmit power in a cell (Downlink DL) or the noise rise ratio (uplink UL). The estimation is typically based on network measurements and/or UE measurements. While RB utilization in LTE may be estimated over a past time period (i.e., based on averaging of the amount of utilized radio resources over the time), it may be desirable to predict and evaluate the serving or neighbor cell load for a given change (e.g., an admitted UE or expanded cell range). This and related problems are addressed by the solutions described in this disclosure.

SUMMARY

A method is disclosed for determining a coupling characteristic in a radio communications network (which may be a simulated radio communications network). In some embodiments, the method comprises determining a cell load coupling characteristic between a first and second of a plurality of cells of a radio communications network. The determining is based on a cell load contribution that is dependent on: (1) a measure of a signal received by a receiving node of the first cell from a transmitting node of the first cell, (2) a measure of a signal received by the receiving node from a transmitting node of the second cell, and (3) a measure of traffic between the receiving node and the transmitting node of the first cell. In some embodiments, the radio communications network may be a real or simulated radio communications network.

In some embodiments, the receiving node may correspond to a wireless communication device served by the first cell, and the transmitting nodes may correspond to respective radio network nodes, e.g., eNodeBs in LTE. In a special example, the two transmitting nodes may be the same radio network node which manages the serving cell (first cell) and the second cell interfering to the serving cell. Alternatively, the receiving node may correspond to a radio network node of the first cell, and the transmitting nodes may correspond to respective wireless communication devices.

In some embodiments, the signal measures may correspond to respective absolute or relative received power levels of the signals. The measure of traffic may correspond to traffic demand, a quality of service demand, a user subscription rate, a bearer service rate, target bitrate, maximum bitrate, or a relationship between a traffic demand of the communication device and one or more resources of the first cell.

In some embodiments, the measures of the signals received from the first and second cells may be communicated using a cell selection offset or cell reselection offset configured for the wireless communication device, i.e., the two signals difference would not exceed the corresponding cell selection offset.

In some embodiments, determining the cell load coupling characteristic may be performed by a radio base station, a radio network controller (RNC), a self-organizing network (SON) node, or an operations and maintenance (O&M) node. In some embodiments, the cell load contribution may be an aggregate component reflecting contributions of multiple user equipment devices or bearers.

In some embodiments, the method may further comprise signaling the cell load coupling characteristic to another network node.

In some embodiments, the method may further comprise collecting respective cell load coupling characteristics for couples of the plurality of cells.

In some embodiments, the method may also include performing one or more network management functions based on the determined cell load coupling characteristic. In some embodiments, the performing the one or more network management functions may comprise performing one of the following operations: neighbor cell evaluation, QoS evaluation and control, load estimation, load prediction, load balancing, capacity estimation, inter-cell interference coordination, handover, cell range control, admission control, congestion control, or radio network configuration evaluation.

In some embodiments, one or more network management functions may comprise any one or more of: (1) optimizing a heterogeneous network deployment, by using the cell load coupling characteristic for optimizing cell configuration, optimizing transmit points configuration, or optimizing receive points configuration; (2) creating a neighbor categorization, wherein creating the neighbor categorization comprises: identifying, based on one or more cell load coupling characteristics, a first group of the plurality of cells that significantly impact the first cell and a second group of the plurality of cells that do not significantly impact the given cell; (3) making a single-cell radio-resource utilization decision for the first cell, wherein making the single-cell decision comprises: using the cell load coupling characteristic to evaluate a single-cell change due to an event for the first cell, comparing the single-cell change to a threshold, and adopting or rejecting the single-cell change dependent on the comparing to the threshold; or (4) making a multi-cell decision radio-resource utilization decision for two or more of the plurality of cells, wherein the decision comprises one or more of: intra-frequency handover, cell range optimization, load balancing, reconfiguration of a multi-leg connection on the same frequency (e.g., CoMP), inter-cell interference coordination, or radio network planning and optimization actions.

In some embodiments, performing the one or more network management functions may depend on one or more cell-load coupling system properties chosen from: (1) concavity, (2) asymptotic rate of load growth; (3) uniqueness of the load solution; (4) lower bounding; (5) existence of the load solution; (6) upper bounding; (7) solution existence for the constrained cell-load coupling system.

In some embodiments, the method may further comprise determining a cell load coupling matrix. The determining may be further based on one or more properties chosen from: (1) concavity, (2) asymptotic rate of load growth; (3) uniqueness of the load solution; (4) lower bounding; (5) existence of the load solution; (6) upper bounding; (7) solution existence for the constrained cell-load coupling system. The cell load coupling matrix may be used for one or more of: calculating the cell load of one or more of a plurality of cells of the wireless communication network; estimating the existence of a load solution; estimating the feasibility of a network configuration; or performing a network management function.

In some embodiments, an apparatus for radio communications network management is disclosed. The apparatus may comprise a cell load coupling calculator configured to use a cell load contribution to determine a cell load coupling characteristic between a first and second of a plurality of cells of a radio communications network (which may be a simulated radio communications network). The cell load contribution may depend on: (1) a measure of a signal received by a receiving node of the first cell from a transmitting node of the first cell; (2) a measure of a signal received by the receiving node from a transmitting node of the second cell; and (3) a measure of traffic between the receiving node and the transmitting node of the first cell.

In some embodiments, a computer-readable storage medium storing program instructions executable by a computer processor to implement a simulation of a radio communications network is disclosed. The simulated radio communications network comprises a plurality of cells, including a plurality of radio network nodes associated with the cells. The simulation is configured to determine a cell load coupling characteristic between a first and second of the plurality of cells, where the determining is based on a cell load contribution that is dependent on: (1) a measure of a signal received by a receiving node of the first cell from a transmitting node of the first cell; (2) a measure of a signal received by the receiving node from a transmitting node of the second cell; and (3) a measure of traffic between the receiving node and the transmitting node of the first cell.

In various embodiments, at least some of the methods described herein may be implemented in whole or in part as a computer program, module, computer software, simulator, radio network planning tool, radio network dimensioning tool, emulator, testbed, testing equipment, etc.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
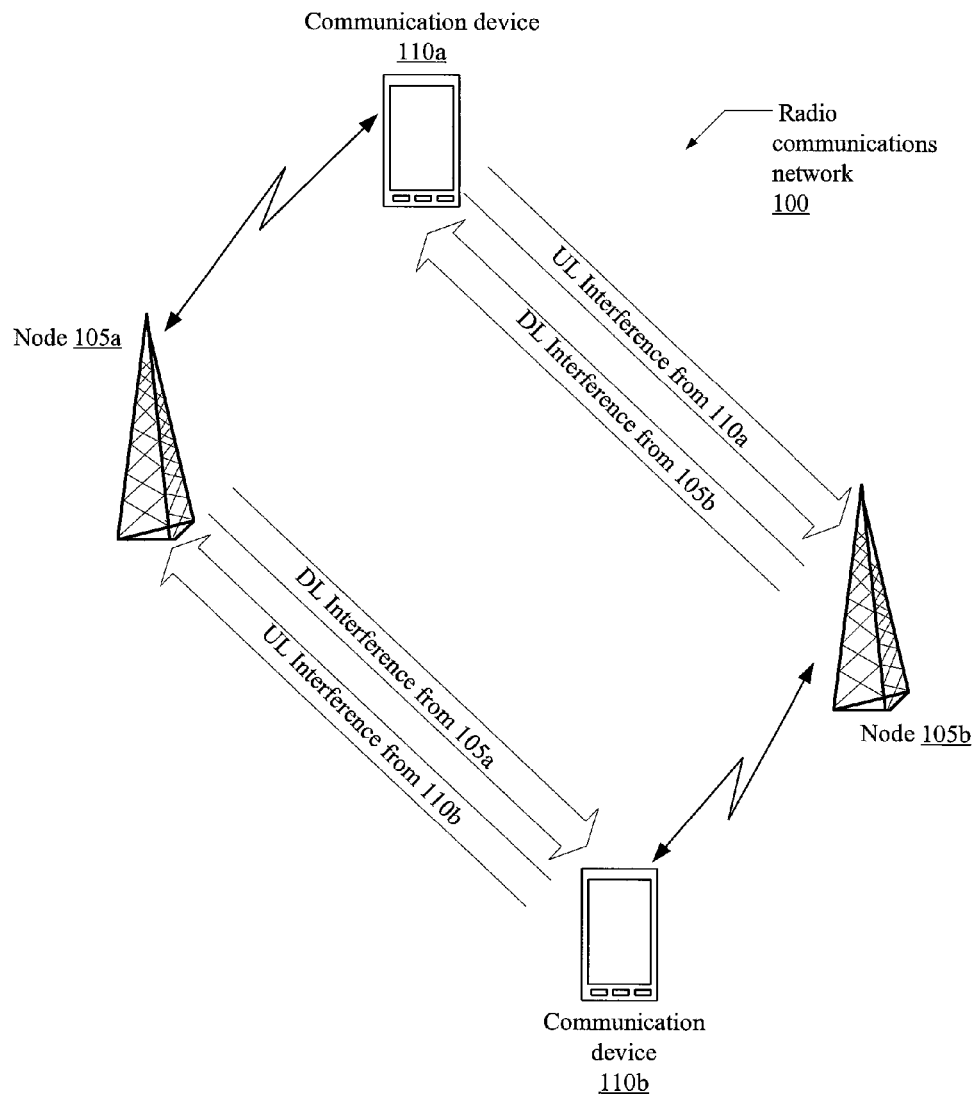
FIG. 1 illustrates a radio communications network that may be managed using cell load coupling information, according to various embodiments.

Management of a radio communications network is a complex and essential task for building efficient, high-performance wireless networks. For example, planning and optimization of wireless networks (e.g., an LTE deployment) may include managing base station location and antenna parameter configuration and algorithmic approaches for network-level performance evaluation. In addition to network planning, network management decisions must be made during network operation based on dynamic load conditions in the radio communications network. Such decisions and adjustments may be made dynamically by automated systems.

Radio resource management (RRM) refers to automated techniques for making radio communications network optimization decisions. RRM may include a set of functionalities that allows for controlling and balancing radio resource utilization among different cells of a network during the network operation. A goal of RRM algorithms is to maximize radio resource utilization efficiency and ensure the requested service quality.

A significant deficiency in prior radio resource management techniques is a failure to fully consider the interference between network cells (e.g., cell towers, antennae, etc.) of the radio communications network. Interference between cells may be referred to herein as "cell load coupling." A more specific definition of the term is given below. Traditional network management techniques do not utilize a cell load coupling concept or cell relation characterizations based on cell load coupling properties (e.g., taking into account traffic demand and/or QoS). Consequently, no network management algorithms exist for estimating or predicting the load of cells based on the cell coupling, which may take traffic demand and/or QoS into account.

According to various embodiments, a concept of cell load coupling is defined along with a characterization of that coupling. Methods and systems are disclosed for gathering cell load coupling information in a radio communications network and leveraging that information to make various network management decisions and/or carry out various network management functions. In various embodiments, cell load coupling information may be used for network management decisions/functions such as load and capacity estimation, performance prediction, network control based on cell load coupling characteristics, enhanced QoS control, and traffic-demand driven neighbor classification. Cell load coupling information may also be used to implement enhanced RRM algorithms that address problems such as admission control, inter-cell interference coordination (ICIC), radio network planning/optimization, single-cell decisions, and multi-cell decisions. Accordingly, the new cell load coupling concept may be used to benefit QoS systems, RRM algorithms, and radio network planning and optimization, such as offline tools.

Many of the embodiments disclosed herein are described with more focus on heterogeneous deployments. However, the proposed solutions are not limited to such deployments, nor are they limited to the 3GPP definition of heterogeneous network deployments. For example, the techniques could be adopted also for traditional macro deployments and/or networks operating more than one radio access technology (RAT). Additionally, although the description is mainly oriented towards downlink operation, the embodiments may also be adapted for uplink.

In some embodiments, the signaling provided by the proposed solutions may be via direct links or logical links (e.g. via higher layer protocols and/or via one or more network nodes). For example, signaling from a coordinating node may pass another network node.

For downlink, although the many embodiments are described that use user equipment (UE) to perform network measurements, it should be understood by those skilled in the art that "UE" is a non-limiting term and may refer to any wireless device or node, such as a PDA, laptop, mobile, sensor, fixed relay, mobile relay or even a radio base station with the measurement capability. Adding/accepting a UE in a cell may also be understood as establishing a new radio bearer in general, and that a "physical" UE may have one or more radio bearers.

For uplink, a measuring node may be implemented by any radio node, such as an eNodeB in LTE, relay node, radio measurement unit, or general radio base station. Adding a new uplink (UL) connection or a UE may be understood in the described embodiments as establishing a new radio bearer in general, and that a "physical" UE may have one or more radio bearers.

A non-GBR radio bearer in the embodiments may also be viewed, without limiting the scope of the proposed solutions, as a GBR radio bearer with a low target bitrate.

A cell may be associated with a radio node. The terms radio node, radio network node, and eNodeB may be used interchangeably herein. A radio node may generally comprise any node transmitting radio signals used for measurements (e.g., eNodeB, macro/micro/pico base station, home eNodeB, relay, beacon device, repeater, transmit/receive point, etc.). A radio node may operate in one or more frequencies or frequency bands. The radio node may be capable of CA. A radio node may also be a single-RAT or multi-RAT node, which may support multi-standard radio (MSR) and/or operate in a mixed mode.

In some embodiments, a cell may also be understood as a physical or logical cell. A physical cell may have its own Physical Cell ID or PCI while a logical cell may not. A logical cell may share a PCI with another radio node (e.g., eNodeB). Some examples of logical cells are Remote Radio Units (RRUs), relay nodes not creating own cell ID, transmit and/or receive nodes used with Distributed Antenna System (DAS), etc.

The term "coordinating node," as used herein refers to a network node (which may also be a radio network node) that coordinates radio resources with one or more radio network nodes or transmit/receive nodes. A coordinating node may be a gateway node, a radio controller, a radio node controlling one or more transmit/receive nodes in a DAS, etc.

The proposed solutions described herein are not limited to LTE, but may apply to any Radio Access Network (RAN), single-RAT, or multi-RAT. Some other RAT examples are LTE-Advanced, HSPA, UMTS, GSM, cdma2000, WiMAX, WiFi, or any OFDM-based system.

FIG. 1 illustrates an example radio communications network that may be managed using cell load coupling information, according to various embodiments. Although the described solutions may be implemented in any appropriate type of telecommunication system supporting any suitable communication standards and using any suitable components, particular embodiments disclosed herein are described in terms of an LTE network. However, such description does not limit the scope of embodiments only to LTE networks.

A radio communications network may include one or more instances of user equipment (UEs) and one or more base stations capable of communicating with those UEs, along with any additional elements suitable to support communication between UEs or between a UE and another communication device (such as a landline telephone).

In the illustrated embodiment, radio communications network 100 includes two communication devices 110a-110b. Communication devices 110 may correspond to any UEs, such as a PDA, laptop, mobile, sensor, fixed relay, mobile relay or even a radio base station with the measurement capability. Communication devices 110 are configured to communicate with any number of entities, including nodes 105, by sending and receiving radio signals.

Radio communications network 100 includes two radio nodes 105a-105b (e.g., base stations) configured to communicate with communication devices 110. As described above, a radio node may generally comprise any node transmitting radio signals, such as an eNodeB, macro/micro/pico base station, home eNodeB, relay, beacon device, repeater, transmit/receive point, or other node. In the illustrated embodiment, nodes 105a and 105b may be associated with different cells.

In various embodiments, one or more of radio nodes 105 may act as a coordinating node that coordinates radio resources with one or more other radio network nodes or transmit/receive nodes. In particular embodiments, this coordinating node may represent or include a gateway node, a radio controller, a radio node controlling one or more transmit/receive nodes in a DAS, or any other suitable node. Although in some embodiments the coordinating node may be part of a radio access network, in other embodiments, the coordinating node may instead be part of a core network or other portions of the overall communication network in question. Furthermore, in certain embodiments, various systems and solutions described herein may be implemented without the use of a separate coordinating node, and the base stations or other elements of the wireless communication network may instead provide the described coordinating functionality.

According to the illustrated embodiment, communication devices 110 are configured to communicate with one or more of radio nodes 105. For example, in FIG. 1, communication device 110a is communicating with node 105a. Communication device 100b is pictured as communicating with node 105b. At any one time, a communication device 110 may be using a given node 105 to handle a data transfer (e.g., telephone call, text message, internet browsing, etc.).

An important operational goal of a radio communications network is to provide a sufficient quality of service to network subscribers (e.g., communication devices 110). In LTE, the quality of service (QoS) concept is closely related to Evolved Packet System (EPS) bearers. An EPS bearer may correspond to the level of granularity for bearer-level QoS control in the EPC/E-UTRAN. That is, all traffic mapped to the same EPS bearer may receive the same bearer level packet forwarding treatment (e.g. scheduling policy, queue management policy, rate shaping policy, RLC configuration, etc.). Providing different bearer level packet forwarding treatment may require separate EPS bearers. An EPS bearer uniquely identifies traffic flows that receive a common QoS treatment between given user equipment (UE) and a PDN GW or Serving GW.

An EPS bearer is referred to as a GBR bearer if dedicated network resources related to a Guaranteed Bit Rate (GBR) value that is associated with the EPS bearer are permanently allocated (e.g. by an admission control function in the eNodeB) at bearer establishment/modification. Otherwise, an EPS bearer is referred to as a Non-GBR bearer.

Each EPS bearer (GBR and Non-GBR) may be associated with a QoS Class Identifier (QCI) and an Allocation and Retention Priority (ARP). QCI is a scalar that is used as a reference to access node-specific parameters that control bearer level packet forwarding treatment (e.g. scheduling weights, admission thresholds, queue management thresholds, link layer protocol configuration, etc.), where the parameters have been pre-configured by the operator owning the access node (e.g. eNodeB). ARP describes priority level information that is used to decide whether a bearer establishment modification request can be accepted or needs to be rejected due to resource limitations (e.g., available radio capacity for GBR bearers). The decision is used to ensure that the request of the bearer with the higher priority level is preferred. In addition, the ARP can be used (e.g. by the eNodeB) to decide which bearer(s) to drop during exceptional resource limitations (e.g. at handover).

Each GBR bearer may additionally be associated with bearer level QoS parameters that include a guaranteed bit rate (GBR) and maximum hit rte (MBR). GBR may denote the bit rate that the GBR bearer can be expected to be provided. MBR may limit that bit rate. Excess traffic may get discarded by a rate shaping function. MBR and GBR may be enforced by scheduling.

Additionally, there may be various aggregate QoS parameters, such as Access Point Name (APN), Aggregate Maximum Bit Rate (AMBR), and UE-AMBR. While the GBR and MBR denote bit rates of traffic per bearer, the UE-AMBR/APN-AMBR denote bit rates of traffic per group of bearers. Each of those QoS parameters may have an uplink and a downlink component. The APN-AMBR may correspond to a subscription parameter stored per APN in the HSS. The APN-AMBR may limit the aggregate bit rate that can be expected to be provided across all Non-GBR bearers and across all PDN connections of the same APN (e.g. excess traffic may get discarded by a rate shaping function). Each of those Non-GBR bearers could potentially utilize the entire APN-AMBR, e.g. when the other Non GBR bearers do not carry any traffic. GBR bearers are outside the scope of APN-AMBR. Enforcement of the bitrates specified by APN-AMBR for downlink may be performed by P-GW, whilst for UL this is done in the UE and may additionally done by P-GW.

The UE-AMBR may be limited by a subscription parameter stored in the HSS. The MME may set the UE-AMBR to the sum of the APN-AMBR of all active APNs up to the value of the subscribed UE-AMBR. The UE-AMBR limits the aggregate bit rate that can be expected to be provided across all Non-GBR bearers of a UE (e.g. excess traffic may get discarded by a rate shaping function). Each of those Non-GBR bearers could potentially utilize the entire UE-AMBR, e.g. when the other Non-GBR bearers do not carry any traffic. GBR bearers are outside the scope of UE-AMBR. The E-UTRAN enforces the UE-AMBR in uplink and downlink.

Elements of a radio communications network may interfere with one another's operation. For example, if a given node is handling a high load volume, it may cause increased interference, which may degrade service at a nearby node or in a neighbour cell associated with that node. For example, in radio communications network 100, transmissions by nodes 105 and/or communication devices 110 create some level of interference with the other nodes or devices. In the illustrated embodiment, transmissions from communication device 110a interfere with those from device 110b by creating uplink interference with node 105a. Likewise, transmissions from communication device 110b interfere with communications from device 110a by creating uplink interference with node 105a. Furthermore, transmissions from node 105a interfere with those from node 105b by creating downlink interference with communication device 110b and transmissions from node 105b interfere with those from node 105a by creating downlink interference with communication device 110a. The term "cell load coupling," as used herein, refers to this interference as it relates to a pair of cells (e.g., two uplink cells or two downlink cells). Uplink (UL) cell load refers to the interference coming from devices (UEs) in UL links and downlink (DL) cell load refers to interference coming from other cells in DL links, even though in both cases, each of the DL and UL cells may be associated with a BS. The UL cell is not necessarily the same as the DL cell. It should be noted that an interference relationship between nodes or devices may not be reciprocal.

Cell load coupling may have an important impact on network performance. Accordingly, in various embodiments, cell load coupling information may be gathered and used for making network management decisions and/or informing network management actions.

Figure 2:
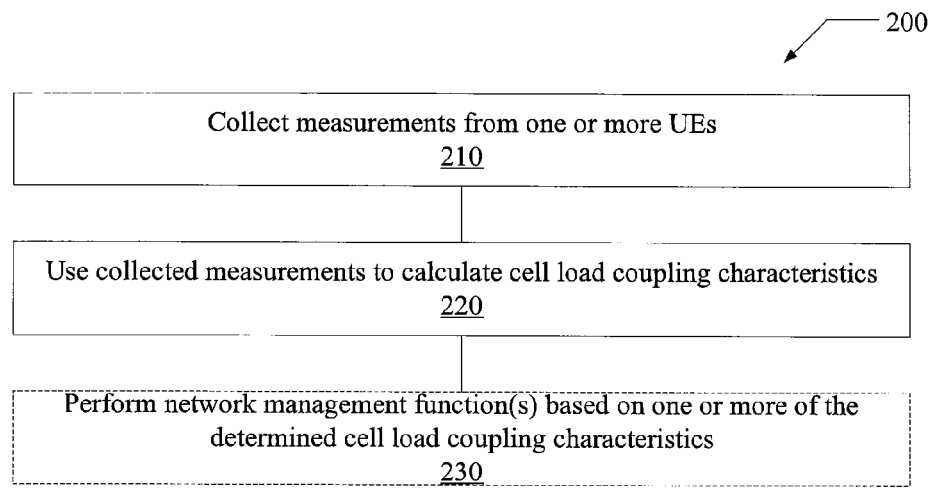
FIG. 2 is a flow diagram illustrating a method for using cell load coupling information for network management, according to some embodiments.

FIG. 2 is a flow diagram illustrating a method for using cell load coupling information for network management, according to some embodiments. Method 200 may be executed collectively by various nodes and/or entities of a radio communications network, such as 100.

Method 200 begins in 210 by collecting signal measurements from one or more UEs. In some embodiments, the measurements may indicate signal strength observed by a given UE. For example, a given node may collect a measure of its signal strength from each UE with which the node can communicate. In various embodiments, a UE may report signal characteristics other than signal strength.

In some embodiments, the signal characteristics that a UE reports to a given node in 210 may comprise signal characteristics of a signal received by the UE from the node and signal characteristics of signals received by the UE from one or more other nodes. In this manner, a network node may collect comparative characteristics of signals received by the UEs from the node and those received by the UE from neighbouring nodes.

In 220, the measurements received in 210 are used to calculate cell load coupling characteristics, as described in detail herein. Once the cell load coupling characteristics are calculated in 220, a network manager may use the calculated characteristics to perform any number of network management functions, as in 230, which is optional.

The term "network management functions" may refer broadly to any actions that modify the network configuration, to any calculations that support network monitoring, any calculations that support network management decisions, etc. For example, a network management action may refer to using the cell load coupling information for optimizing cell or transmit points, or the action may refer to performing cell evaluation, QoS evaluation/control, load estimation, load prediction, cell range control, etc. Many examples of network management actions are described in more detail below.

The term "network manager" may refer to any entity configured to perform network management functions. In some embodiments, the network manager may correspond to a single coordinating entity (e.g., coordinating node), to a group of nodes, a node in the core network, and/or any other entities capable of network management functionality.

In various embodiments, collection step 220 may be performed by various entities. For example, in some embodiments, step 220 may be performed by the network manager. In such an embodiment, nodes that collected the UE measurements in 210 may simply report those measurements to the network manager and, in 220, the network manager may use the measurements to calculate cell load coupling characteristics. In other embodiments, step 220 may be partially executed by the collecting nodes. For example, in 220, each node that collected measurements in 210 may use those measurements to calculate cell load coupling characteristics between itself and neighbouring nodes. In such embodiments, the nodes may then report the calculated characteristics to the network manager.

Figure 3:
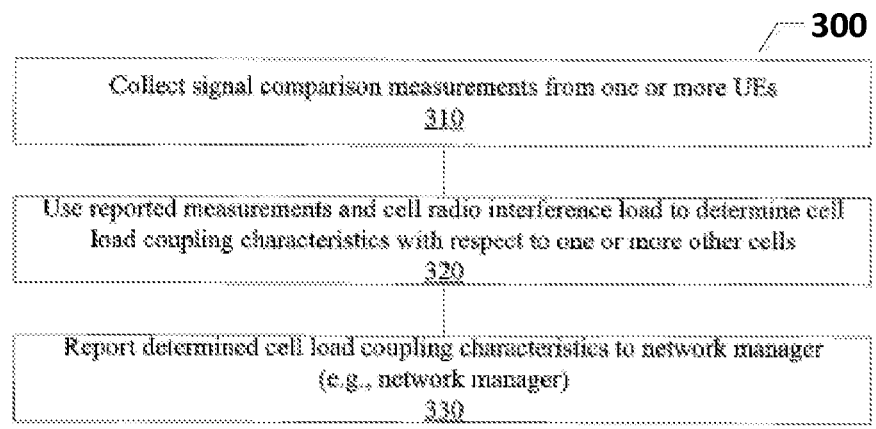
FIG. 3 is a flow diagram of a method for collecting and reporting cell load coupling characteristics, according to some embodiments.

FIG. 3 is a flow diagram of a method for collecting and reporting cell load coupling characteristics, according to some embodiments. Method 300 of FIG. 3 may be executed by a node of a radio communications network, such as any of nodes 105 of FIG. 1.

Method 300 begins in 310 where the node collects signal comparison measurements from one or more UEs. For example, a UE may report the signal strength of the node and the signal strength of various other nodes with which the UE can communicate.

In 320, the node uses the reported measurements to determine cell load coupling characteristics between it and one or more other nodes. For example, if a UE reports (in 310) the signal strength of the node and four other nodes, the node may use this information to calculate cell load coupling characteristics between it and the other four nodes. The calculation of these characteristics is described in more detail below.

In 330, the node reports the determined cell load coupling characteristics to the network manager, such as a central coordinating node.

Figure 4:
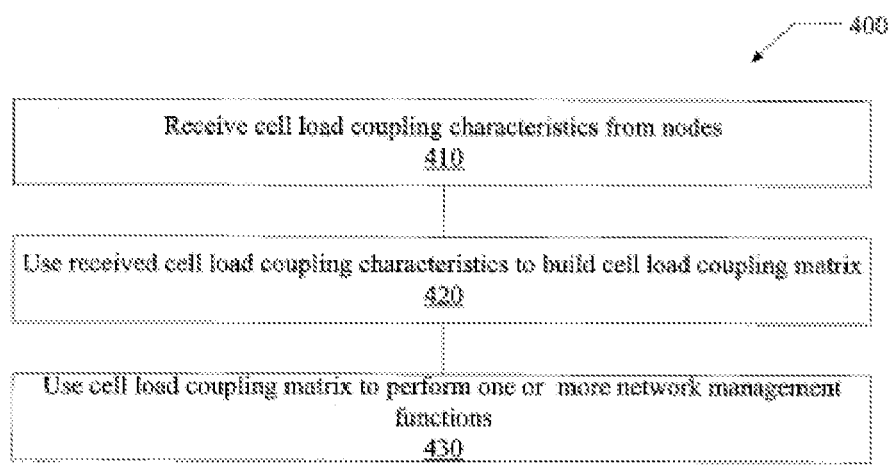
FIG. 4 is a flow diagram illustrating a method for receiving and taking network actions based on cell load coupling characteristics, according to some embodiments.

FIG. 4 is a flow diagram illustrating a method for receiving and taking network actions based on cell load coupling characteristics, according to some embodiments. The method of FIG. 4 may be executed by a network manager capable of performing network management functions. In various embodiments, the method of FIG. 4 may be performed by a single coordinating network manager or by a number of network managers. In some embodiments, the network management functionality may be completely distributed such that method 400 may be performed by any number of nodes in a radio communications network.

Method 400 begins in 410 where the network manager receives cell load coupling characteristics from one or more nodes. The cell load coupling characteristics that the network manager receives in 410 may correspond to those reported by the nodes in 330 of FIG. 3. In some embodiments, the network manager may receive direct UE measurements in 410 (rather than cell load coupling characteristics), and use those measurements to calculate the cell load coupling characteristics between nodes in the network.

In 420, the network manager uses the received cell load coupling characteristics to build a cell load coupling matrix. For example, for N nodes, the network manager may build an N×N matrix where each cell corresponds to a unique combination of two nodes. In such a matrix, cell C[i][j] may correspond to the impact (e.g., interference) of node i on node j. A matrix is used here only for illustrative purposes, and it will be understood by one skilled in the art that various other data structures may be used in place of a matrix. In various embodiments, the matrix elements may be the characteristics themselves or some function of the characteristics. The specific elements used in the matrix may vary depending on the network management actions that the matrix is intended to support.

Figure 5:
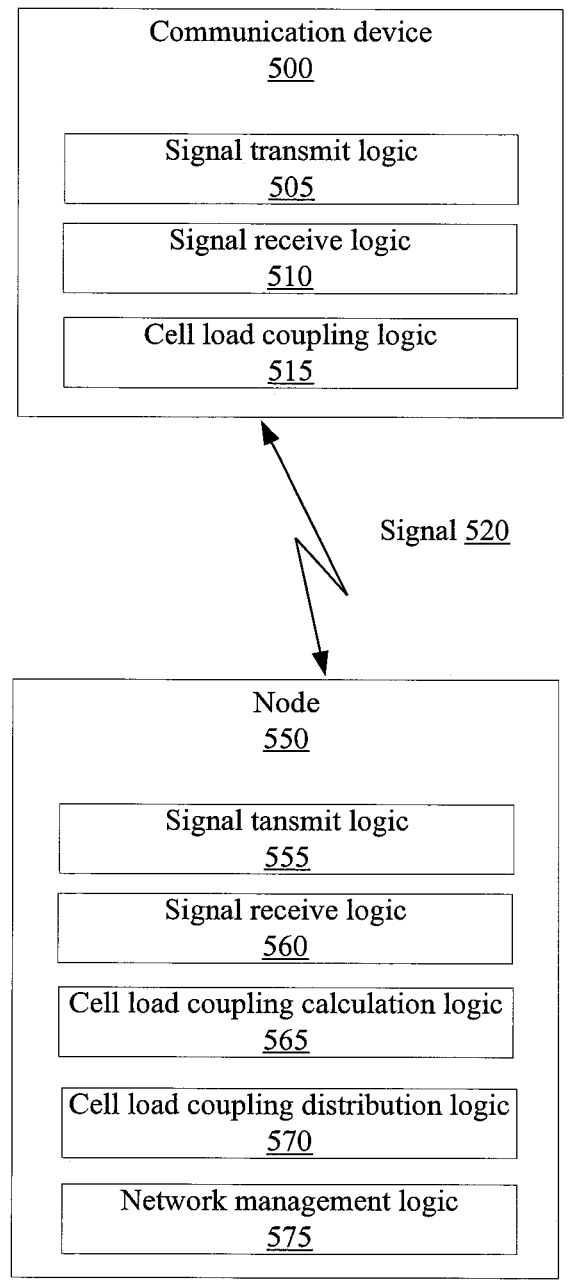
FIG. 5 is a block diagram illustrating the components of a communication device (i.e., UE) and a radio node configured to implement cell load coupling techniques, according to some embodiments.

FIG. 5 is a block diagram illustrating the components of a communication device (i.e., UE) and a radio node configured to implement cell load coupling techniques, according to some embodiments. Communication device 500 may correspond to any UE, such as any of communication devices 110 of FIG. 1. Node 550 may correspond to any network resource node, such as any of nodes 105 in FIG. 1.

According to the illustrated embodiment of FIG. 5, communication device 500 comprises signal transmit logic 505, signal receive logic 510, and cell load coupling logic 515. Each of components 505-515 may contain additional subcomponents not illustrated in FIG. 5.

Signal transmit logic 505 may be configured to transmit digital data via an analog signal (e.g., signal 520) for communication with other devices. For example, transmit logic 505 may take digital data and create an analog signal that represents the digital data. To create the analog signal, the signal transmit logic may include standard transmission components, such as a modulator configured to modulate data according to a given protocol (e.g., GMSK). Communication device 500 may use signal transmit logic 505 to create signal 520 and thereby communicate with node 550.

Signal receive logic 510 may be configured to receive digital data via an analog signal (e.g., signal 520) that was sent by another device (e.g., node 550). Signal receive logic 510 may include standard components, such as a demodulator configured to demodulate a signal according to a given protocol.

Cell load coupling logic 515 may be configured to gather and report cell load coupling information (e.g., measurements usable to calculate cell load coupling characteristics), as described herein. In some embodiments, cell load coupling logic 515 may include logic for measuring various characteristics of a signal received from various nodes, such as node 550, and to transmit those measurements to a network node (e.g., node 550, network manager, etc.).

In some embodiments, cell load coupling logic 515 may take and report the signal measurements in response to a prompt from a network node. In various embodiments, the prompt may be a one-time prompt or an indication of a reporting schedule. For instance, node 550 may indicate to communication device 500 that it is to report signal measurements to node 550 every N-seconds. In response to receiving such an indication, cell load coupling logic 515 may be configured to collect and transmit signal measurements according to the indicated schedule.

According to the illustrated embodiment, node 550 comprises signal transmit logic 555, signal receive logic 560, cell load coupling calculation logic 565, cell load coupling distribution logic 570, and network management logic 575. Each of components 555-575 may contain additional subcomponents not illustrated in FIG. 5.

Node 550 is configured to communicate with communication device 500 via signals, such as signal 520. Signal transmit logic 555 and signal receive logic 560 may serve analogous functions to signal transmit logic 505 and signal receive logic 510 of communication device 500. That is, signal transmit logic 555 may create a modulated signal to communicate with any number of other nodes or communication devices (e.g., 500) and signal receive logic 560 may receive and decode a modulated signal sent by another node or communication device (e.g., 500). Accordingly, signal receive logic 560 may receive signal measurements from communication device 500, as in step 310 of method 300.

Node 550 also includes cell load coupling calculation logic 565, which may be configured to calculate cell load coupling characteristics based on received signal measurements, as described herein. Accordingly calculation logic 565 may use received measurements to calculate cell load coupling characteristics, as in step 320 of method 300.

Node 550 further comprises cell load coupling distribution logic 570, which may be configured to distribute cell load coupling characteristics (i.e., those calculated by logic 565) to other nodes, such as a network manager. In some embodiments, distribution logic 570 may be configured to send the coupling characteristics directly to a central network manager. In other embodiments, distribution logic 570 may be configured to report coupling characteristics to the network manager by cooperating with analogous distribution logic on other radio nodes of the network. For example, the distribution logics of multiple nodes may be organized into a reporting hierarchy (e.g., tree structure) to facilitate reporting and reduce load on the network manager. Accordingly, cell load coupling distribution logic 570 may report cell load coupling characteristics, as in step 330 of method 300.

In embodiments with multiple network managers, or where the network management is fully distributed, distribution logic 570 be configured to distribute the cell load coupling characteristics according to a distributed protocol. The particular protocol may vary depending on the number and/or nature of network managers in the system.

In the illustrated embodiment, node 550 includes network management logic 575, which may be configured to perform network management functions. As discussed above, network management functions may include making network management decisions, performing calculations in support of network management decisions, initiating and/or performing any network management actions, as described herein. Accordingly, network management logic 575 may be configured to perform step 430 of method 400.

As shown in FIG. 5, a given network node may host network management functionality, such as network management logic 575. In various embodiments, network management logic maybe hosted on a dedicated node or on a normal node that supports subscriber load. In embodiments where a network node hosts network management logic (e.g., node 550), cell load coupling calculation logic 565 may perform additional functionality, such as creating a cell load coupling matrix, as in step 420 of FIG. 4.

It is to be understood that the components illustrated in FIG. 5 are illustrative and that in various embodiments, communication device 500 and/or node 550 may include fewer or additional components not illustrated. Furthermore, functionality described with relation to particular components and/or the components themselves may be subsumed into other components.

As discussed above, according to various embodiments, network nodes may collect measurements from UEs, calculate cell load coupling characteristics, and report those characteristics to one or more network managers. The network manager(s) may then use the cell load coupling characteristics to perform various network management functions.

Figure 6:
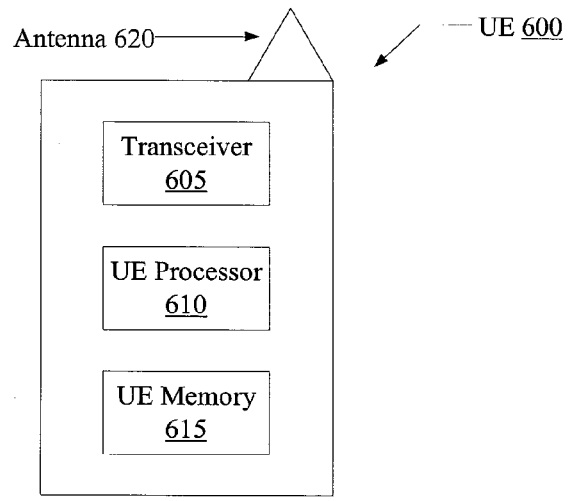
FIG. 6 is a block diagram illustrating hardware components of a UE configured to participate in cell load coupling methods, according to various embodiments.

FIG. 6 is a block diagram illustrating hardware components of a UE configured to participate in cell load coupling methods, according to various embodiments. UE 600 of FIG. 6 may correspond to communication device 500 of FIG. 5 and/or any of communication devices 110 of FIG. 1.

Although the illustrated UEs of FIGS. 1 and 5 may represent communication devices that include any suitable combination of hardware and/or software, these UEs may, in some embodiments, represent devices such as the example UE illustrated in greater detail by FIG. 6.

As shown in FIG. 6, the example UE includes transceiver 605, processor 610, memory 615, and antenna 620. In particular embodiments, some or all of the functionality described herein as being provided by mobile communication devices or other forms of UE may be provided by the UE processor executing instructions stored on a computer-readable medium, such as the memory shown in FIG. 6. Alternative embodiments of the UE may include additional components beyond those shown in FIG. 6 that may be responsible for providing certain aspects of the UE's functionality, including any of the functionality described above and/or any functionality necessary to support the solution described above.

Figure 7:
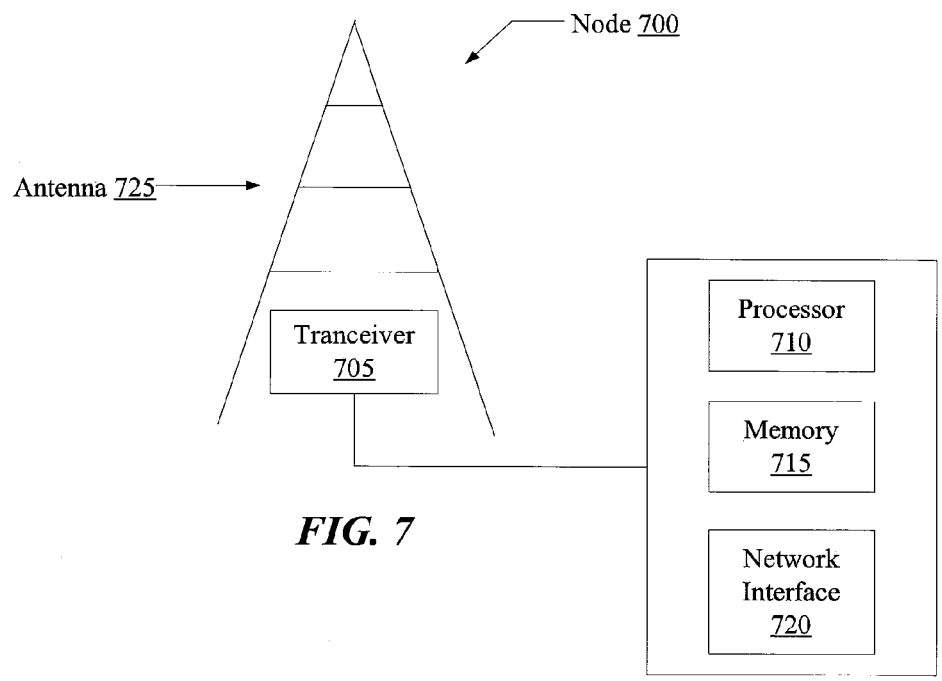
FIG. 7 is a block diagram illustrating hardware components of a network node (e.g., base station), according to some embodiments.

FIG. 7 is a block diagram illustrating hardware components of a network node (e.g., base station), according to some embodiments. Node 700 of FIG. 7 may correspond to node 550 of FIG. 5 and/or to any of nodes 105 of FIG. 1. Although the illustrated network nodes of FIG. 1 may include any suitable combination of hardware and/or software, these elements may, in particular embodiments, represent devices such as those illustrated in greater detail by FIG. 7.

As shown in FIG. 7, node 700 includes transceiver 705, processor 710, memory 715, network interface 720, and antenna 725. In particular embodiments, some or all of the functionality described herein as being provided by a mobile base station, a base station controller, a node B, an enhanced node B, and/or any other type of mobile communications node may be provided by the base station processor executing instructions stored on a computer-readable medium, such as the memory shown in FIG. 7. Alternative embodiments of the base station may include additional components responsible for providing additional functionality, including any of the functionality identified above and/or any functionality necessary to support the solution described above.

Cell Load Coupling Overview

According to various embodiments, cell load coupling characterizations may be used to provide various functionality, such as methods of determining the feasibility of a given traffic demand and network configuration from the system capacity point of view, methods of determining network capacity, methods of determining the relation between two cells based on cell coupling with traffic demand being taken into account, methods for estimating cell load based on the bounding approach exploiting cell coupling information, and others. As discussed above, such methods may be implemented in a network node or in any test or trial system (e.g., one comprising a set of test network node equipment, UE equipment, test equipment, emulators, and/or simulation tools) or in a simulator.

Although the embodiments described herein are mainly for downlink, the cell load coupling concept may also be adopted for uplink. Further, the concept may also be used for estimating the load on specific time-frequency resources (which may be a subset of all time-frequency resources in the system (e.g., in case the resources are reused in time and/or frequency such as full reuse or fractional resource reuse) or specific physical signals (e.g., downlink or uplink reference signals) or channels (e.g., control or data channels).

Example applications of the concept (e.g., load balancing and admission control, etc.) are described below. The possible set of nodes that may utilize the concept described herein depends on the application and its implementation (e.g., centralized, semi-centralized or distributed). Some examples of such nodes are radio nodes (e.g., eNodeB in LTE) and a controlling node (e.g., a radio node coordinating other radio nodes, e.g., RNC in UMTS or donor eNodeB in LTE; a network node coordinating other radio nodes, e.g., SON node, O&M node, etc.).

Load Coupling System Specification

The following notation is used herein to describe the cell load coupling system:

$N=\{1, \ldots, n\}$: set of cells

J: Set of area elements covered by the network, each corresponding to a point of a geographical size, e.g., a pixel of a grid map over the network area or a UE location.

$J_i$: The subset of J served by cell i $d_j$: Traffic demand of area element j (e.g., with unit bit), specified for the frequency-time domain, for which the cell load coupling characteristics are analyzed and used by the network.

$g_{ij}$: Total power gain between antenna of cell i and area element j $P_i$: Power spectral density per minimum-size resource unit (RU) in scheduling $\sigma^2$: Power spectral density per minimum-size resource unit (RU) in scheduling B: Bandwidth per RU K: Total number of available RUs in the frequency-time domain $\rho=(\rho_1, \rho_2, \ldots, \rho_n)$: Cell load vector The term "cell load" used herein is a non-negative real number that represents the proportion of RUs scheduled for transmission for serving traffic demand. Statistically, the load of a cell may also be viewed as the probability that the cell generates interference to other cells in a set of resources with a reuse factor of one.

The term "cell load coupling" refers to the relationship between the elements in the cell load vector for a multi-cell network or its part. The coupling relation originates from inter-cell interference. The term "cell load coupling system" is a mathematical form of cell load coupling.

The signal to interference plus noise ratio (SINR) of area element j served by cell i is calculated by Equation (1). In the equation, the first term of the denominator contains a scaling by the cell load values as probability of inter-cell interference. Hence the SINR is a function of the load vector $\rho=(\rho_1, \rho_2, \ldots, \rho_n)$.

$$SINR_j(\rho) = \frac{P_i g_{ij}}{\sum_{k \in N: k \neq i} P_k g_{kj} \rho_k + \sigma^2} \quad (1)$$

The effective data rate, in bits per RU, delivered to an area element j in $J_i$ is calculated by Equation (2).

$$Rate_j(\rho) = B \log_2(1 + SINR_j(\rho)) \quad (2)$$

To satisfy traffic demand $d_j$, the number of required RUs equals $d_j/Rate_j(\rho)$. The overall required RUs in cell i is $$\sum_{j \in J_i} d_j / Rate_j(\rho).$$

The ratio between this number and K defines the load of i, that is, the proportion of RUs required for transmitting data. The equation of the load of cell i is given in Equation (3).

$$\rho_i = \quad (3)$$

$$f_i(\rho) = \frac{1}{K}\sum_{j \in J_i} \frac{d_j}{\text{Rate}_j(\rho)} = \frac{1}{KB}\sum_{j \in J_i} \frac{d_j}{\log_2\left(1 + \frac{P_i g_{ij}}{\sum_{k \in N: k \neq i} P_k g_{kj}\rho_k + \sigma^2}\right)}$$

Observation 1:

It follows from Equation (3) that the load of a cell i may be described as a sum of the ratios of the normalized demand to the experienced rate, where the sum is taken over all UEs/bearers in the cell, i.e., $$f_i(\rho) = \sum_{j \in J_i} \frac{normalizedDemand_j}{\text{Rate}_j(\rho)}.$$

Further, a term for element j in the sum may also be an aggregate term (i.e., may represent multiple UEs/bearers), and normalizedDemand$_j$ may be an aggregate or average normalized traffic demand, and Rate$_j(\rho)$ may be an aggregate or average rate. For example, the aggregate term may be defined to model performance of a small hotspot where a number of users may have similar propagation and interference conditions, e.g., for some $j \in J_i$ the corresponding term may be defined as $$\frac{normalizedDemand_j}{\text{Rate}_j(\rho)} = M \cdot \frac{normalizedDemand}{\text{Rate}(\rho)}$$

with M as the number of UEs in the hotspot, and normalizedDemand is the average demand among the M UEs in the hotspot. In yet another example, $$\frac{normalizedDemand_j}{\text{Rate}_j(\rho)}$$

may approximate $$\sum_q \frac{normalizedDemand_{j,q}}{\text{Rate}_{j,q}(\rho)}$$

where UE/bearer q belongs to group j.

In Equation (3), function $f_i$, defined on $R_+^{n-1} \rightarrow R_+$, characterizes the coupling relation between cell load $\rho_i$ and those of the other cells in the network. In compact notation, a vector of functions $f = (f_1, \ldots, f_n)$ is used. Except the load vector $\rho$, all other terms in the functions are constants in system characterization. In compact notation, the cell load coupling system is given by Equation (4).

$$\rho = f(\rho), \rho \geq 0 \quad (4)$$

A solution to the load coupling system refers to a non-negative real-numbered vector $\rho$ satisfying Equation (4). In characterizing the system, its solution is not restricted to be at most one. For a solution containing elements greater than one, the values give valuable information on the severity of overloading as well as how much additional spectrum would be required to satisfy the traffic demand, and thus may also be viewed as a means to characterize the performance of the system or set of cells in an area. The load in the system is a solution to (4). Finding this solution may involve solving the non-linear system of equations (4). In practice, however, without directly solving (4) one can exploit the properties of this system for estimating, predicting and optimizing the load in the network, which may be crucial for optimizing network performance in certain embodiments.

Properties of the Cell Load Coupling System

The function $f = (f_1, \ldots, f_n)$ in the load-coupling system has four basic properties. These properties follow from Equation (3).

For each $i = 1, \ldots, n$, $f_i$ is strictly increasing.

For each $i = 1, \ldots, n$, $f_i$ does not depend on the load of cell i.

The function is strictly positive, even if interference is zero, that is $f(0) > 0$.

The function is continuous and at least twice differentiable.

Some additional notation is now introduced for the purpose of compactness of the equations below:

$$a_j = \frac{K \cdot B}{d_j},$$

$j \in J$: The parameter captures the relation between cell resource and the traffic demand of an area element.

$$b_{ikj} = \frac{P_k g_{kj}}{P_i g_{ij}},$$

$i \in N$, $j \in J_i$: The parameter gives the difference in the received signal strengths between cells i and k at area element j.

$$c_{ij} = \frac{\sigma^2}{P_i g_{ij}},$$

$i \in N$, $j \in J_i$: The parameter captures the relation between the received serving signal and noise power at area element j.

$$U_{ij}(\rho) = \sum_{h \in N; h \neq i} b_{ihj}\rho_h + c_{ij},$$

$i \in N$, $j \in J_i$: The parameter defines the total interference and noise, scaled by the received signal strength of the serving cell.

Using the notation given above, the partial derivative of function $f_i$ in the load of cell k is given in Equation (5).

$$\frac{\partial f_i}{\partial \rho_k} = \ln(2)\sum_{j \in J_i} \frac{b_{ikj}}{a_j} \frac{1}{\ln^2\left(1 + \frac{1}{U_{ij}(\rho)}\right)U_{ij}^2(\rho)\left(1 + \frac{1}{U_{ij}(\rho)}\right)}, \quad (5)$$

$$i, k, \in N, i \neq k$$

For any given load vector $\rho$, the partial derivative $$\frac{\partial f_i}{\partial \rho_k}$$

is the first-order approximation of the load growth of cell i in the load of cell k. This can be used as a metric for the impact of interference of cell k on cell i.

Seven properties may be derived for a cell load coupling system. A respective mathematical proof for each property is provided in Appendix A below. In some embodiments, a subset of the seven properties may be derived.

Property 1 (Concavity):

For all $i \in N$, $f_i$ is strictly concave in $R_+^{n-1}$.

By Property 1, the unit increase of cell load, represented by the partial derivative, becomes monotonically smaller when interference grows. Therefore, the system is most interference-sensitive in the low-load region.

A key characterization of the load coupling system is the asymptotic rate of load growth. In addition to being monotonically decreasing (by Property 1), the first-order partial derivative converges to a positive constant at limit.

Property 2 (Asymptotic Rate of Load Growth):

$$\lim_{\rho_k \to \infty} \frac{\partial f_i}{\partial \rho_k} = \ln(2) \sum_{j \in J_i} \frac{b_{ikj}}{a_j}, \quad i, k \in N, i \neq k$$

By Property 2, the shape of the load function converges to a hyper plane with constant slopes in all dimensions when load grows. The unit impact of interference on cell load is monotonically decreasing (Property 1) but does not diminish, because it is bounded from below by the limit values given in Property 2. At limit, the cell load coupling system approaches a linear equation system. Discussed below are a few non-limiting examples of using linear equation systems charactering cell load coupling for different network functions such as admission control, load balancing, and network planning and optimization.

An advantage provided by Property 2 is the simplicity and the small amount of information necessary for evaluating network configuration or different single- or multi-cell decisions.

A solution satisfying the cell load coupling system in Equation (3) is a stable working point. At this point, the load vector reaches equilibrium (i.e., no resources more than necessary are consumed, and all traffic demands are satisfied, if the solution exists).

The next fundamental property of cell load coupling is the uniqueness of such an equilibrium, provided that it exists.

Property 3 (Uniqueness of Load Solution):

$\rho = f(\rho)$ has at most one solution in $R_+^n$.

According to Property 3, in various embodiments, cell load coupling avoids arbitrariness in determining the system state for any network and traffic scenario. In such embodiments, this system property may be a necessary condition (e.g. for admission control and load balancing mechanisms based on the cell load coupling system).

Next, sufficient and necessary conditions for the existence of the solution to the load coupling system are derived. The conditions are derived based on the linear system defined in Equation (6).

$$\rho = H^0 \rho + f(0) \quad (6)$$

In Equation (6), $H^0$ is a n×n square matrix. All diagonal elements of the matrix are zeros. For row i and column k with $i \neq k$, the matrix element $$H_{ik}^0 = \ln(2) \sum_{j \in J_i} \frac{b_{ikj}}{a_j}.$$

This is the limit value of the partial derivative (Property 2). The right-hand side of Equation (6) is a linear function in load. By Properties 1 and 2, the linear function is an approximation of the cell load coupling system, and the accuracy of the approximation improves by load. As used herein, the term "cell load coupling matrix" refers to matrix $H^0$. Note that the definition of the cell load coupling matrix and the cell load characteristics introduced later is another embodiment.

Property 4:

$H^0 \rho + f(0) \leq f(\rho)$ for any load vector $\rho \geq 0$.

Property 4 states that the solution to linear system (6) gives a lower bound on the solution to the non-linear system (4).

Lemma 1:

$H^0 \rho + f(\hat{\rho}) \leq f(\rho)$ for any lower bound $\hat{\rho}$. By Lemma 1, if $\hat{\rho}$ is a lower bound, the solution to $\rho = H^0 \rho + f(\hat{\rho})$ is also a lower bound to the solution of the non-linear system (4). This property is exploited in the bounding principle described herein.

A key property of the next aspect is the characterization of solution existence by means of the linear Equations (6). By this property, the two systems are equivalent in solution existence. The property is formulated as:

Property 5:

The cell load coupling system (4) has a solution, if and only if the linear equation system (6) has a solution.

Properties 4-5 enable the following: (1) determining whether or not a given traffic demand may lead to congestion in at least some network parts or can be supported at all in the network with a given network configuration, (2) determining the inherent system capacity limit that is solely dependent on the network deployment structure by exploiting Property 5; (3) providing simple means for evaluating "how good" (i.e., close to a desirable state) a given network configuration is, which is important when comparing different configurations; (4) provide an optimistic estimation of the cell load vector.

Property 6 (Upper Bounding):

$H(\hat{\rho}) \cdot (\rho - \hat{\rho}) + f(\hat{\rho}) \geq f(\rho)$ for any load vector $\rho \geq 0$ and $\hat{\rho} > 0$.

According to Property 6, the solution to system $\rho = H(\hat{\rho}) \cdot (\rho - \hat{\rho}) + f(\hat{\rho})$ (which is a linearization of non-linear system (4)), where $H(\hat{\rho})$ is the Jacobian of $f(\rho)$ evaluated in $\hat{\rho}$, gives an upper bound on the solution to the non-linear system (4). The elements of the non-diagonal Jacobian are defined by Equations (5), whilst the diagonal elements are zeros. In one example, $\hat{\rho}$ may be the solution to system (6), i.e., $\rho = H^0 \rho + f(0)$.

The next property addresses a cell-load coupling system with a load constraint added such as in (7) where the maximum-bound vector $\rho^{max}$ is introduced to limit $\rho$. This limit may be e.g. a vector of ones, i.e., no cell load can exceed 100% or it may contain elements, $\rho_i$, having any values in the range of (0, $\rho_i^{max}$].

$$\rho = f(\rho), \rho \geq 0, \rho \leq \rho^{max} \quad (7)$$

Property 7 (solution existence for the constrained cell-load coupling system): if the above system (7) has a solution, then it is sufficient and necessary that $0 < \rho(\rho^{max}) \leq \rho^{max}$, where $\rho(\rho^{max})$ may be a solution to linear system $\rho = H(\rho^{max}) \cdot (\rho - \rho^{max}) + f(\rho^{max})$, i.e., $\rho(\rho^{max}) = (I - H(\rho^{max}))^{-1} \cdot (-H(\rho^{max}) \cdot \rho^{max} + f(\rho^{max}))$.

Figure 9:
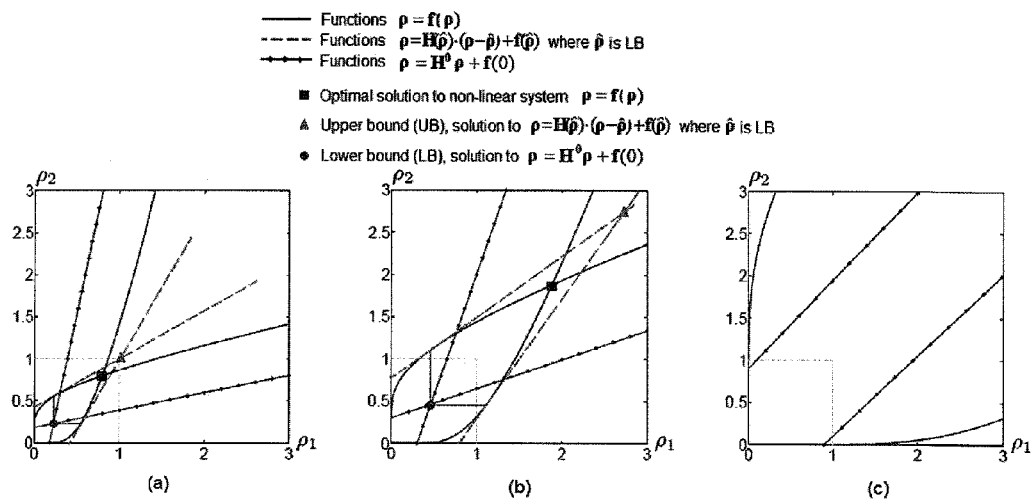
FIG. 9 illustrates three scenarios for a cell coupling system and the properties described herein.

FIG. 9 illustrates three scenarios for a cell coupling system and the described herein properties. The figure also shows the true load solution, the lower bound, and the upper bound. (a) Feasible solution within network capacity, i.e., $0 \leq \rho \leq 1$ (dotted lines in all three figures indicate the solution space bounded by cell load levels equal to 1.0); (b) Feasible solution beyond network capacity, i.e., $\rho_i > 1$ for at least some i; (c) Infeasible system, i.e., no solution to equation system (6) or to equation system (4).

Cell load coupling matrix $H^0$ has been introduced above. Generally, each non-diagonal element (i,k) of the matrix captures the aggregate impact of cell k on cell i and more specifically the sum of load contributions of individual points receiving a service in cell i, that is, $$\mu \sum_j \frac{b_{ikj}}{a_j}$$

where μ is a scaling factor, and each individual load contribution j comprises two components: (1) component b capturing the difference in the received signal characteristics (received signal strength, in particular, or pathloss difference if the transmit power is the same) between the cells k and i, and (2) component a capturing the traffic demand and/or QoS. In this aspect, the more general term "cell load coupling characteristic", may be used. In some embodiments, the characteristic comprises at least one component b and at least one component a. In one example, the characteristic may be of the form $$\mu \sum_{j \in J_i} \frac{b_{ikj}}{a_j},$$

where μ is a positive number (which may also equal 1), set $J_i$ comprises at least one element j, and element j may be a UE or a bearer served in cell i or it may also be an aggregate component reflecting multiple UEs and/or bearers.

In another example, the cell load coupling characteristic may be associated with a certain traffic type (e.g., a specific GBR service, or a pre-defined traffic demand). In yet another example, the component a may be the same for all or a group of individual load contributions. In this example, naturally, when $a_j$ is the same for all $j \in J_i$ (e.g., the cell i provides service with the same QoS for all UEs), it may be captured in μ or alternatively the cell load coupling characteristic capturing the impact of cell k on cell i may be represented as $$\frac{\mu}{a} \sum_{j \in J_i} b_{ikj}.$$

Other variants are also possible. For example, cell load coupling characteristic may additionally include a "correction factor", e.g., approximating or corresponding to $$\frac{1}{\ln^2\left(1 + \frac{1}{U_{ij}(\rho)}\right) U_{ij}^2(\rho) \left(1 + \frac{1}{U_{ij}(\rho)}\right)}$$

in Equation (5), where $$U_{ij}(\rho) = \sum_{h \in N : h \neq i} b_{ihj} \rho_h + c_{ij}$$

is as defined above. Note that $U_{ij}(\rho)$ may be obtained in practice for a current load in the network (e.g., from interference and noise measurements or SINR and SNR reports).

In general, a cell load coupling characteristic characterizing the impact of one cell on the other cell captures traffic characteristics and signal characteristics of the two cells or their relation. The signal characteristic may be obtained from signal measurements (e.g., neighbor and serving cell RSRP—see the examples of measurements described herein). The traffic and/or QoS characteristic are typically also known, e.g., from the requested service type, QoS parameters, user subscription, etc.

Cell load coupling characteristic may be associated with a certain RAT and/or a set of time and/or frequency resources, e.g., frequency subbands, time slots, low-interference subframes, etc. The various use cases of the cell load coupling characteristic are described further herein.

The b-component in the cell load coupling characteristic in the previous examples is closely related to the cell selection/reselection offset Δ. In particular, if cell i is the serving cell and cell k is the neighbor, then for this pair of cells and a user j, the current user-specific offset in linear scale is $\overline{\Delta}_j = b_{ikj}$. In heterogeneous networks, the offset characterizing the cell range expansion when Δ>0 or cell range shrinking when Δ<0 with respect to a UE, group of UEs or all UEs is the maximum offset with which the user will stay in cell i, i.e. $\overline{\Delta}_j \leq \overline{\Delta}$, where $\overline{\Delta}$ is the linear-scale version of the offset Δ. So, for user j which is in handover to cell i the optimistic estimation of the potential contribution to the cell i's load coupling characteristic (if the user is admitted in cell i) is $$\mu \frac{\overline{\Delta}}{a_j}.$$

As explained in more detail below, the above observation may also be used, for example, for optimizing the cell range of cells in a network, which is particularly advantageous in heterogeneous deployments).

Cell Load Estimation Using Cell Load Coupling

Solving the non-linear system (4) directly is not trivial, although the solution may be approached numerically (e.g., using Newton-Raphson method). The method, however, does not provide the quality of the numerical solution. Further, it may not be possible to control the solution quality. Controlling solution quality is enabled by the bounding principle described below. The principle based on the cell load coupling properties, in addition to the simple means provided by Property 5 for verifying the solution existence for system (4).

Property 4 formulates the lower bound (LB) on the load solution to the non-linear system (4), i.e., the solution, let it be denoted by $\rho^{LB}$, to the linear system of equations $\rho = H^0 \rho + f(0)$ is a LB to the solution to the non-linear system (4). Solution $\rho^{LB}$ always exists whenever the non-linear system (4) has a solution.

Property 6 formulates the upper bound (UB) on the load solution to the non-linear system (4). More specifically, the solution, let it be denoted by $\rho^{UB}$, to the linear system of equations $\rho = H(\hat{\rho}) \cdot (\rho - \hat{\rho}) + f(\hat{\rho})$, if exists, is an UB to the solution to the non-linear system (4). Approximating a load solution using the bounding principle may comprise the following steps:

step (1) specify one or more stopping criteria, e.g., the target solution quality ε (the acceptable difference between the upper and the lower bounds) or the maximum number of steps;

step (2) define the lower bound as the load vector $\rho^{LB}$ (in some embodiments, the initial load vector and the lower bound is based on the solution to system (6) (Property 4);

step (3) use Property 6 to find the new UB $\rho^{UB}$ as a solution to the system $\rho = H(\rho^{LB}) \cdot (\rho - \rho^{LB}) + f(\rho^{LB})$ (note that a solution to system $\rho = H(\rho^{UB}) \cdot (\rho - \rho^{UB}) + f(\rho^{UB})$ with respect to ρ will also give an improved UB, but requires knowing $\rho^{UB}$ from a previous step);

step (4) if a stopping criterion is met (e.g., the distance between the UB $\rho^{UB}$ and the LB $\rho^{LB}$ does not exceed $\epsilon$), return $\rho^{LB}$ and $\rho^{UB}$ and stop. Otherwise, go to step (5);

step (5) update $\rho^{LB}$ and return to step (3). The new $\rho^{LB}$ may be found as a solution to $\rho=H^0\rho+f(\rho^{LB})$ where $\rho^{LB}$ is the vector used in step (4).

The convergence property of the algorithm above may also be used as a basis for cell load estimation or prediction in a distributed way, which may be exploited by RRM algorithms, which is another aspect of certain embodiments of the proposed solutions.

Capacity Estimation Using Cell Load Coupling Information

The problem addressed by this aspect is finding the maximum scaling factor k such that the system $\rho=k\cdot f(\rho)$, $\rho \geq 0$ still has a solution (i.e., finding an upper limit for system capacity). The scaling factor k may reflect, for example, the change in traffic demand (e.g., described by the earlier defined parameter $d_j$) or the change in the amount of available time-frequency resources K (e.g., when optimizing the resource reuse in time and/or frequency such as defining certain scheduling patterns on a subset of resources).

Exploiting Property 5, and the properties of eigenvalues in a linear system, one can derive that $$k \leq \frac{1}{\max\{\hat{\lambda}\}} \leq \frac{1}{\max\{\lambda^0\}},$$

where $\max\{\lambda^0\}$ is the maximum eigenvalue of the cell load coupling matrix $H^0$, and $\max\{\hat{\lambda}\}$ is the maximum eigenvalue of the corrected cell load coupling matrix, i.e., $H(\hat{\rho})$.

Measurements and Information Enabling Cell Load Coupling Estimation

Below are some non-limiting example measurements and information that may be used for obtaining the cell load coupling characteristic:

Bearer rate corresponding to QoS, e.g., GBR, MBR or AMBR, may be used for deriving traffic-related information, Absolute received signal strength in downlink or uplink (e.g., RSRP in LTE downlink or CPICH RSCP for UTRA downlink), measured by UE or a radio node, respectively, Relative received signal strength in downlink or uplink (e.g., RSRP of a neighbor relative to the RSRP of the serving cell), measured by UE or a radio node, respectively, Signal over noise (SNR), Thermal noise power in downlink or uplink, measured by UE or a radio node, respectively, Downlink or uplink transmit power information, e.g.,
  Maximum transmit power or a power class of a radio node or UE,
  Transmit power level of a radio node or UE, in general or for certain time-frequency resources, channels or signals,
  Relative Narrowband Tx Power (RNTP) signaled via X2 indicating, per physical resource block, whether downlink transmission power is lower than the value indicated by the RNTP Threshold
  Transmit power offset (e.g., when the transmit power on certain channels or time-frequency resources differs from a reference transmit power which may be the CRS transmit power), Absolute pathloss measurement in downlink or uplink, measured by UE or a radio node (e.g., may be estimated as a difference of the received signal strength and transmit power)

Relative pathloss measurement in downlink or uplink, measured by UE or radio node, Load information or interference information in neighbor cells, e.g., Load Indicator or High Interference Indication or High Interference Overload Indication signaled via X2, Radio resource status, such as that signaled via X2 for downlink and uplink for indicating resource utilization for GBR, non-GBR or all physical resource blocks, Cell capacity information, e.g., Cell Capacity Class or Cell Capacity signaled via X2, which may be used, e.g., for setting the thresholds or estimating the cell load, Transmission bandwidth, e.g., exchanged via X2, Subframe alignment, e.g., exchanged via X2, Frequency information, e.g., exchanged via X2, Bit rate, e.g., as signaled via X2 in LTE where the bit rate is the number of bits delivered by E-UTRAN in UL or to E-UTRAN in DL within a period of time, divided by the duration of the period, Maximum bit rate, e.g., UE Aggregate Maximum Bit Rate as signaled via X2.

The cell load coupling characteristic may be obtained, e.g., in a radio node or other network node, e.g., SON or centralized RRM node, or test equipment and the estimation in each such node may concern one or more cells.

Further, the obtained cell load coupling characteristic may be communicated via the relevant interface to another node (e.g., a radio node or a network node such as SON or RRM node) or UE. The load coupling characteristic of at least one second cell received by a first cell from a radio node associated with the second cell or another network node may be used e.g. for estimating cell load of the first cell or enhancing RRM.

Using Cell Load Coupling Characteristics to Enhance Radio Network Performance

The cell load coupling characteristics may be used statically, semi-statically or dynamically, for radio network planning, RRM, and for on-line or off-line optimization of radio resource utilization in a radio network.

The methods described herein may comprise one or more of:
  Obtaining a cell load coupling characteristic of one or more cells, (any of: serving, primary or neighbor cells) for one or more frequency/carrier/RAT, where acquiring the necessary information may be
    via explicit signaling or relaying or deriving from radio measurements,
    for DL and/or UL radio communications,
    performed by a radio network node (e.g., eNodeB, RNC, home base station, etc.) or UE or a network node in general (including SON node, O&M) or any coordinating node;
  Constructing a cell load coupling matrix for a set of cells;
  Using the cell load coupling information for the following operations
    neighbor cell evaluation (as described herein),
    QoS evaluation and control,
    Load estimation, prediction, and control,
    Radio network configuration evaluation;
  Using the cell load coupling information for one or more of the following functions:
    Automatic Neighbor Relation (ANR) (as described herein, Single- or multi-cell RRM (e.g., radio bearer control (RBC), radio admission or congestion control, mobility and handover control, load balancing, dynamic resource allocation and scheduling, and ICIC), Radio network planning and optimization (e.g., SON, O&M, radio network planning/optimization tools);

Using the cell load coupling information for optimizing cell or transmit points or receive points (e.g., with RRUs or multiple transmit/receive points sharing the same cell ID) configuration (e.g., related to coverage/serving range, cell load, amount of served traffic, QoS, number of UEs, etc.) in heterogeneous deployments.

The methods above may be used for single-cell decisions and/or for multi-cell decisions, although either of the two may involve evaluations related to one or more cells: the concerned cell(s) and/or neighbor cell(s).

Neighbor Cell Evaluation Based on Cell Load Coupling

Cell load coupling information may be used for neighbor cell evaluation and categorizing neighbor into strong and weak neighbors is based on cell load coupling.

According to one embodiment, a set of neighbor cells may be divided into two subsets, namely, the subset of significantly interfering neighbor cells (or simply, strong neighbors) and the subset of less interfering neighbor cells (or simply, weak neighbors). The selection criterion may be based on the cell load coupling information. Thus, instead of classifying neighbor cells either based on distance or received signal strength, the neighbor cell classification is traffic-demand driven and more realistically reflects the impact on the cell load.

In one example, cell k is considered to be a strong neighbor of cell i if the element $H_{ik}^0$ exceeds a threshold, otherwise cell k is a weak neighbor of cell i. It is worth noting that matrix $H^0$ is generally not symmetric, which means that there may exist a case when cell k is a strong neighbor of cell i, whilst cell i is not a strong neighbor of cell k. This aspect may further distinguish certain implementations of the proposed solutions from existing solutions.

In another embodiment, the neighbor cells may be classified into more than two subsets, for example, by (1) using more than one threshold (e.g., very strong neighbors, medium neighbors and weak neighbors), or (2) combining the traffic-demand driven criterion with another criterion (e.g., strong neighbors with high traffic demand, strong neighbors with low traffic demand and weak neighbors).

The cell load coupling information may also be used to enhance the Automatic Neighbor Relation (ANR) function. The purpose of ANR is to relieve the operator's burden on managing manually Neighbor Relations (NR). The ANR function resides in the eNodeB and manages the conceptual Neighbour Relation Table (NRT). Located within ANR, the Neighbour Detection Function finds new neighbours and adds them to the NRT. ANR also contains the Neighbour Removal Function, which removes outdated NRs. The Neighbour Detection Function and the Neighbour Removal Function are implementation-specific. An NR in the context of ANR is defined as follows: An existing NR from a source cell to a target cell means that eNodeB controlling the source cell (a) knows the ECGI/CGI and PCI of the target cell, (b) has an entry in the Neighbour Relation Table for the source cell identifying the target cell, and (c) has the attributes in this NRT entry defined, either by O&M or set to default values. In some embodiments, NRT is enhanced with the information related to cell load coupling characteristic (which may also be associated with at least one specific frequency and/or RAT), which may potentially benefit also the SON function since it may be used as an indicator of the impact of a change in the source cell on the target cell performance and vice versa. Such information may also be indicative for the need to avoid that the source cell and the target cell use the radio resources that overlap in time and/or frequency. For example, non-overlapping radio resources (e.g., restricted measurement subframes or separate frequency subbands) may be used to avoid strong disturbance in a cell with high traffic demand or high QoS targets.

Single-Cell Decisions

In various embodiments, cell load coupling concepts may be used to make single-cell decisions for network management. A single-cell decision refers to a radio-resource utilization related decision made by/for a single cell on a specific carrier/frequency/RAT. Such decisions may still involve the evaluation of the decision impact on other cells (e.g., due to interference change). Multi-cell decisions concerning cells with radio communications on fully orthogonal time-frequency resources (e.g., in multi-carrier or multi-RAT system with multi-cell decisions concerning at most one cell per carrier/frequency/RAT, may be considered as single-cell decisions.

Some examples of single-cell decisions are:

Bearer (re)configuration, e.g.,

Reconfiguring (increase or decrease) rate such as GBR or MBR or AMBR,

UE/bearer admission control (admit or reject a UE service request), e.g., in relation to UE activation, Handover to/from another carrier/frequency/RAT, Carrier switching or new carrier configuration in a multi-carrier system, with or without carrier aggregation, New radio link establishment in multi-link communication, e.g, with CoMP, DAS, MIMO, etc.

UE/bearer dropping (to drop or not a radio link).

In the examples above, the impact of the positive decision may be either increased interference towards neighbor cells (e.g., when a new UE is admitted in a cell) or improved interference conditions (e.g., when a connection is dropped). In either case, estimating and predicting the amount of degradation/gain may be important and may be assessed with the help of the proposed solutions.

In summary, the scenarios addressed by this aspect may be generalized to the following three categories of single-cell changes:

adding a new link, dropping a link, reconfiguration of a link.

In some embodiments, a cell load coupling system may be used to support an explicit determination of a single-cell change impact. A change in a cell has two effects: direct and indirect effect. The direct effect is the cell load change in the cell where the change occurs, assuming no impact on other cells and in turn their impact on cell i. The direct effect may be described as the change of the function $f_i(\rho)$ to $\tilde{f}_i(\rho)$ for the cell i where the change occurs, and the amount of the corresponding change (measured as the cell load change) in this cell is $$\Delta f_i = \tilde{f}_i(\rho) - f_i(\rho) = \alpha \cdot \frac{d_j}{K \cdot \text{Rate}_j(\rho)} = \alpha \cdot \frac{normalizedDemand_j}{\text{Rate}_j(\rho)},$$

where $\text{Rate}_j(\rho)$ may be calculated as in Equation (2) or may be a practical rate, $\alpha=1$ when a new link (or UE) j in cell i is added, $0<\alpha<1$ when e.g. the rate of the existing link (or UE) j in cell i decreases and the decrease is reflected in $\alpha$, $-1<\alpha<0$ when e.g. the rate of the existing link (or UE) j in cell i increases, and α=−1 when the existing link (or UE) j in cell i is dropped. Further, it can be noted that the embodiment is not limited to a single UE/bearer, but may also be adapted in a straightforward way to multiple UEs/bearers, e.g., $$\Delta f_i = \sum_{j \in \tilde{J}_i} \alpha_j \cdot \frac{normalizedDemand_j}{Rate_j(\rho)},$$

where $\tilde{J}_i$ is the set of UEs/bearers affected by the change. Furthermore, UE/bearer j may also be an aggregate term, i.e., represent multiple UEs/bearers.

The global impact of a change in cell i, including direct and indirect effects, may be described by vector $\Delta\rho = \tilde{\rho} - \rho$, where $\tilde{\rho}$ is a solution to the changed system $\rho = \tilde{f}(\rho)$, and $\rho$ is the solution to $\rho = f(\rho)$. The global impact estimation is possible when function vector $f(\rho)$ is known, e.g., the information is available in a controlling node or may be obtained from neighbor cell k≠i. Alternatively, an approximation of the total impact $\Delta\rho$ may be obtained when e.g. cell k can provide an estimate of $\Delta f_k$ in reply to the obtained estimated load change $\Delta f_i$ in cell i.

When the change occurs in cell i, either $\Delta\rho_i > \Delta f_i > 0$ or $\Delta\rho_i < \Delta f_i < 0$ holds, so the direct effect (i.e., $\Delta f_i$) may be used as an estimation of the minimum impact (cell load change in cell i) induced by the change in cell i and may be easily obtained since the demand and the current rate values are typically known.

In some embodiments, cell load coupling information may be used to approximate a single cell change impact. As previously discussed, function vector $f(\rho)$ may be not always known for a non-zero $\rho$ in a node making the single-cell decision. Furthermore, solving the system of non-linear equations may be not trivial. The cell load coupling information may be used in such situations to approximate the impact of the change.

By Property 5, the cell load coupling system (4) has a solution, if and only if the linear equation system (6) has a solution. Further, by Property 4, the solution to system (6), i.e., $\rho = H^0\rho + f(0)$, gives a lower bound $\rho^{LB}$ on the solution $\rho$ to the non-linear system (4).

With a single-cell change for UE/bearer j in cell i, neglecting the change in f(0) which would typically be small, only the row i of matrix $H^0$ changes, i.e., the changed matrix may be represented as $\tilde{H}^0 = H^0 + e_i(\tilde{H}_i^0 - H_i^0)$, where $e_i$ is a unit column vector with 1 as the i-th element, and $(\tilde{H}_i^0 - H_i^0)$ is a row vector describing the change in the row i of matrix $H^0$ and having elements $$\tilde{H}_{ik}^0 - H_{ik}^0 = \begin{cases} \alpha \cdot \ln(2) \cdot \frac{b_{ikj}}{a_j}, & k \neq i \\ 0, & k = i \end{cases},$$

where
α=1 when a new link (or UE) j in cell i is added, 0<α<1 when e.g. the rate of the existing link (or UE) j in cell i decreases and the decrease is reflected in α, −1<α<0 when e.g. the rate of the existing link (or UE) j in cell i increases, and α=−1 when the existing link (or UE) j in cell i is dropped.

Using the Sherman-Morrison formula, while noting that $I - \tilde{H}^0 = I - H^0 - e_i(\tilde{H}_i^0 - H_i^0)$, the load solution $\tilde{\rho}^{LB}$ to the updated system $\tilde{\rho} = \tilde{H}^0\rho + f(0)$ may be found as follows, $$\tilde{\rho}^{LB} = \rho^{LB} + \frac{(\tilde{H}_i^0 - H_i^0)\rho^{LB}}{1 - (\tilde{H}_i^0 - H_i^0)(I - H^0)^{-1}e_i} \cdot (I - H^0)^{-1}e_i,$$

or $$\Delta\rho^{LB} = \tilde{\rho}^{LB} - \rho^{LB} = \frac{(\tilde{H}_i^0 - H_i^0)\rho^{LB}}{1 - (\tilde{H}_i^0 - H_i^0)(I - H^0)^{-1}e_i} \cdot (I - H^0)^{-1}e_i.$$

Note that the last equation requires knowing $H^0$ (i.e., the matrix before the change) and the changed elements corresponding to the cell where the change occurs (i.e., the information that is likely to be available in this cell). The above formula is a non-limiting example of how $\Delta\rho^{LB}$ may be derived. Another example is a direct approach, e.g., $\Delta\rho^{LB} = \tilde{\rho}^{LB} - \rho^{LB} = (I - \tilde{H}^0)^{-1}f(0) - (I - H^0)^{-1}f(0)$. Without neglecting the change in function f(0), one also gets $\Delta\rho^{LB} = \tilde{\rho}^{LB} - \rho^{LB} = (I - \tilde{H}^0)^{-1}\tilde{f}(0) - (I - H^0)^{-1}f(0)$. Which approach is selected may depend on implementation, computational complexity considerations, available information, etc.

In this case, we observe that $0 < \Delta\rho^{LB} \leq \Delta\rho$, when α>0, and $0 > \Delta\rho^{LB} \geq \Delta\rho$, when α<0, where $\Delta\rho$ is the global impact of the single-cell change in cell i on the load solution to the system (4). Further, when $0 < \Delta\rho^{LB}$, noting that $\rho^{LB} \leq \rho$ and $(I - H^0)^{-1}e_i \leq (I - H^0)^{-1}f(0)/f_i(0) = \rho/f_i(0)$, and thus $$\Delta\rho^{LB} \leq \frac{(\tilde{H}_i^0 - H_i^0)\rho}{f_i(0) - (\tilde{H}_i^0 - H_i^0)\rho} \cdot \rho,$$

where $\rho$ is the load solution to system (4) without the single-cell change, or the current load in the system. Deriving the inequality for $0 > \Delta\rho^{LB}$ is straightforward.

Note also that the single-cell change impact estimation may be derived using the "corrected" cell load coupling matrix. For example, the change in the upper bound may be estimated, e.g., by $\Delta\rho^{UB} = \tilde{\rho}^{UB} - \rho^{UB}$, where $\rho^{UB}$ may be found as a solution to $\rho = H(\hat{\rho}) \cdot (\rho - \hat{\rho}) + f(\hat{\rho})$ and $\tilde{\rho}^{UB}$ may be found as a solution to $\tilde{\rho} = \tilde{H}(\hat{\rho}) \cdot (\rho - \hat{\rho}) + \tilde{f}(\hat{\rho})$.

In some embodiments, cell load coupling information may be used to facilitate single-cell decisions based on impact evaluation. Below we describe an example of a process for making a single-cell decision based on the impact evaluation by either explicit determination or approximation exploiting the cell load coupling information.

To decide a single-cell change in cell i, the following example steps may be executed:
1. Use the cell load coupling information to evaluate the single-cell change, e.g.,
    a. Obtain $(\tilde{H}_i^0 - H_i^0)$ for cell i,
    b. Verify that $\tilde{\rho} = \tilde{H}^0\rho + f(0)$ is solvable and has a positive solution (if yes, system (4) has also a feasible solution and thus the single-cell change is feasible, although not yet known whether it is acceptable),
    If not solvable, the single-cell change under evaluation is not acceptable or needs further analysis by other means,
    If solvable, evaluate the single-cell change—find $\Delta_{single-cell}$, e.g., as one of the following:

○ $\Delta_{single-cell} = \Delta\rho$, or
    ○ $\Delta_{single-cell} = \Delta\rho^{LB}$, or
    ○ $\Delta_{single-cell} = \Delta\rho^{UB}$, or -continued $$\circ \ \Delta_{single-cell} = \frac{(\tilde{H}_i^0 - H_i^0)\rho}{f_i(0) - (\tilde{H}_i^0 - H_i^0)\rho} \cdot \rho;$$

2. Analyze $\Delta_{single-cell}$ reflecting the impact of the single-cell change, e.g., compare a function of $\Delta_{single-cell}$ to a threshold, which may be a scalar or a vector, negative or positive, as one or more of the following:
   If $\Delta_{single-cell} \leq \Delta^{(1)}$, where $\Delta^{(1)}$ is a threshold load vector, accept the single-cell change in cell i under evaluation, otherwise reject, and/or
   If $\Delta_{single-cell,i} \leq \Delta_i^{(2)}$, where $\Delta_i^{(2)}$ is a threshold load for cell i, accept the single-cell change in cell i under evaluation, otherwise reject, and/or
   If $\Delta_{single-cell,k} \leq \Delta_k^{(3)}$, $k \neq i$, where $\Delta_k^{(3)}$ is a threshold load for neighbor cell k, accept the single-cell change in cell i under evaluation, otherwise reject, and/or
   If $F(\Delta_{single-cell}) \leq \Delta^{(4)}$, where $F(\Delta_{single-cell})$ may be the length of load vector $\Delta_{single-cell}$ and $\Delta^{(4)}$ may be a scalar, accept the single-cell change in cell i under evaluation, otherwise reject, and/or
   $\rho + \Delta_{single-cell} \leq \Delta^{(5)}$, i.e., the expected new load is within a certain distance from the current one, accept the single-cell change in cell i under evaluation, otherwise reject.
3. If the single-cell change in cell i is accepted, adopt the single-cell change, e.g., accept UE/bearer, reconfigure the bearer, or drop a bearer. Otherwise, reject the single-cell change, e.g., do not admit the UE/bearer request, do not reconfigure the evaluated bearer or do not drop the evaluated bearer.
4. [Optional] Based on $\Delta_{single-cell}$, decide the next single-cell change in cell i or other cell, e.g.,
   to not admit more UE/bearers, or
   perform admission control on another set of resources, or
   change the rate of more bearers or drop more bearers, or
   choose another bearer (e.g., with a higher traffic demand) to drop when the achieved effect with the current single-cell change is not sufficient.

Example Measurements for Facilitating Single Cell Decisions

In various embodiments, the following measurements may be collected and considered for making the types of single cell decisions described above. In some embodiments, the cell load coupling information for cell i may comprise one or more of:
   Traffic demand and/or service/bearer type or requested QoS,
   Available resources (e.g., the set or a number of available RBs in frequency and time),
   Rate information or received signal information (e.g., received signal in cell i, and relation between the received signal strength of cell i and at least one other cell k),
   The set or at least the number of UEs/bearers served in cell i,
   When a correction factor is used (e.g., as explained in above), interference-related information may also be needed.

This information is typically available for UEs for which cell i is the serving cell. The neighbor cell related information may be received, for example, from the UEs (DL measurements) or from neighbor eNodeBs (UL measurements), such as via X2, when the single-cell decision is made by the radio node.

In some embodiments, the relation between signal strengths may also be approximated (e.g., statistically) by an average or by the maximum difference configurable by the network. Such information may be available, for example, from the SON node or via O&M. A similar approximation approach may be adopted for other parameters, including traffic demand and received signal strength.

The single-cell decision is likely to be made in the radio network node associated with the cell. In case it is to be made by a coordinating node, the relevant information, as listed above, may be signaled to the node making the decision.

To evaluate the impact of a single-cell change in cell i, the deciding node may also consider the current load of the cells to be accounted for in the evaluation, as well as the cell load coupling information associated with the change (e.g., the predicted received signal power for the UE/bearer to be admitted), the relation between the signals for the neighbor cells, requested traffic demand or QoS, and/or other measurements. For admission control, given that a UE in IDLE mode may still perform related measurements and later report to the radio node (e.g., with MDT), such measurements may be made available and used by the deciding node when evaluating the impact of the requested change. For dropping or reconfiguring bearers, at least the serving cell measurements would typically be available to the serving cell. The necessary neighbor cell measurements may be requested on the need basis. Such information may be derived from the UE measurements described above.

Multi-Cell Decisions

In some embodiments, cell load coupling information may be used to enhance multi-cell decisions. A multi-cell decision refers to a radio-resource utilization related decision made by/for a multiple cells. For example, a radio resource optimization problem may inherently comprise multi-cell decision-making. Examples of multi-cell decisions may include:
   Intra-frequency handover (a UE is leaving one cell and attempts to enter another cell),
   Cell range optimization (more than one cells are affected, since some cells hand UEs to other cells),
   Load balancing,
   Reconfiguration of a multi-leg connection on the same frequency, e.g.,
      A UE may have data communication links with more than one cell or transmit/receive node (e.g., with DAS or CoMP), and for the same overall target QoS for this UE, increasing the rate of one link may imply a change of the rate (ideally, reducing) of at least one other link;
   Inter-cell interference coordination (ICIC),
   Radio network planning and optimization.

In summary, multi-cell decisions may be generalized as the changes that involve adding/removing/reconfiguration of at least one link in at least one cell and at the same time adding/removing/reconfiguration of at least one link in at least one other cell. Some examples of the scenarios are described in more details below.

In some embodiments, cell load coupling information may be used to enable UE handover. At a UE handover from one cell to another cell on the same frequency, both cells are impacted since a communication link would typically be removed in the source cell and a new link established in a target cell, if handover is accepted. The source eNodeB initiates the handover preparation by sending the HANDOVER REQUIRED message to the serving MME. When the preparation, including the reservation of resources at the target side is ready, the MME responds with the HANDOVER COMMAND message to the source eNodeB. The MME initiates the procedure by sending the HANDOVER REQUEST message to the target eNodeB.

In the cell load coupling system, with one UE handover, there is a change in the function vector f(ρ) and in the matrix H⁰. In particular, in the row corresponding to the target cell, a new element j is added, similar to adding a new link in the single-cell change. At the same time, in the row corresponding to the source cell the element j corresponding to the UE in handover is removed, again similar to removing a link in the single-cell change. Further, it is noted that with source cell i and target cell l, the changes in row i are as follows, $$\tilde{H}^0_{ik} - H^0_{ik} = \begin{cases} -\ln(2) \cdot \frac{b_{ikj}}{a_j}, & k \neq i \\ 0, & k = i \end{cases},$$

whilst in row l, the changes are $$\tilde{H}^0_{lk} - H^0_{lk} = \begin{cases} \ln(2) \cdot \frac{b_{ikj}}{a_j}, & k \neq l \\ 0, & k = l \end{cases},$$

where $$b_{ikj} = \frac{P_k g_{kj}}{P_i g_{ij}} = \frac{P_i g_{ij}}{P_l g_{lj}} \cdot b_{lkj}$$

for k≠i, k≠l. The latter implies that if the cell load coupling information is known in the source cell for cell i and cell k, then the cell load coupling information for the same UE may be derived for the target cell l and cell k; and the relation $$\frac{P_i g_{ij}}{P_l g_{lj}}$$

would typically be known in the source cell. Thus, the present disclosure provides means in the source cell to estimate the impact of a requested handover (e.g., before sending the HANDOVER REQUIRED message to MME). Such prediction in the source node allows for reducing the probability of requesting handover which is likely to be rejected or may have an undesirable effect on the source/target cell or the network in general.

In another embodiment, such prediction or handover impact estimation may be performed for more than one UEs that are in handover from one cell i to another cell l. The changes in the corresponding rows are the sums of cell load coupling characteristics for the group of UEs. Estimation for a group of UEs may also be very useful when a decision on shutting off the source cell i and handing over its UEs to a neighbor cell l is to be evaluated.

In some embodiments, cell load coupling information may be used to enable load balancing and ICIC. Because handover may also be used for load balancing and ICIC, the basic principle above applies also for load balancing and ICIC. For example, the described principle allows for a quick evaluation of the cell range offset between two cells to enable cell range optimization.

Further, capacity evaluation methods based on cell load coupling information, may also be used to decide the resource reuse in time and/or frequency domain (e.g., when deciding ABS patterns in heterogeneous networks).

Figure 8:
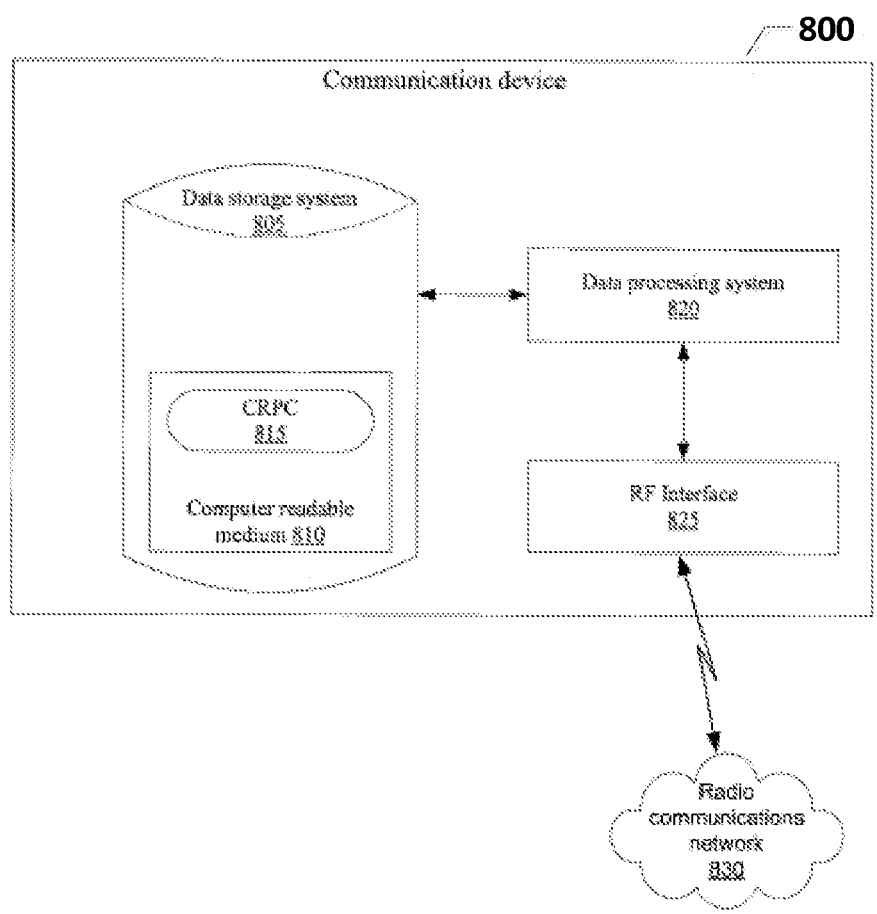
FIG. 8 is a block diagram illustrating a communication device configured for participating in cell load coupling, according to some embodiments.

As shown in FIG. 8, the example positioning server includes a processor, a memory, a network interface, and an antenna. In particular embodiments, some or all of the functionality described above as being provided by a coordinating node may be provided by the node processor executing instructions stored on a computer-readable medium, such as the memory shown in FIG. 8. Alternative embodiments of the positioning server may include additional components responsible for providing additional functionality, including any of the functionality identified above and/or any functionality necessary to support the solution described above.

FIG. 8 is a block diagram illustrating a communication device configured for participating in cell load coupling, according to some embodiments. Apparatus 800 comprises data storage system 805, data processing system 820, and network interface 825 operable to communicate over a network, such as radio communications network 830. In various embodiments, radio communications network 830 may be simulated, emulated or may be a network with true radio propagation, and communications device may be a simulation program or its module, may be an emulation device, or may be a true communications device.

In embodiments where data processing system 820 includes a microprocessor, computer readable program code 815 may be stored in a computer readable medium 810, such as, but not limited, to magnetic media (e.g., a hard disk), optical media (e.g., a DVD), memory devices (e.g., random access memory), etc.

In some embodiments, computer readable program code 815 is configured such that when executed by a processor, code 815 causes the apparatus 800 to implement cell load coupling functionality, as described herein. In other embodiments, apparatus 800 may be configured to perform steps described above without the need for code 815. For example, data processing system 820 may consist merely of specialized hardware, such as one or more application-specific integrated circuits (ASICs). Hence, the features of the present invention described above may be implemented in hardware and/or software. For example, in some embodiments, the functional components of apparatus 800 described above may be implemented by data processing system 820 executing computer instructions 815, by data processing system 820 operating independent of any computer instructions 815, or by any suitable combination of hardware and/or software.

APPENDIX A

Mathematical Proofs of Properties

Proof of Property 1

The proof is given for function $f_n$. By adapting the indices, the proof is valid for any cell. In the proof, notation $u=U_{nj}(\rho)$ is used. The value of u varies by j. Index j is omitted because there is no ambiguity in the forthcoming equations. For function $f_n$, the Hessian element for cells k and h is given in Equation (A.1).

$$\frac{\partial^2 f_i}{\partial \rho_k \partial \rho_h} = \ln(2) \sum_{j \in J_i} \frac{b_{nkj} b_{nhj}}{a_j} \frac{\ln\left(1 + \frac{1}{u}\right)\left[2 - (2u+1)\ln\left(1 + \frac{1}{u}\right)\right]}{\left[\ln^2\left(1 + \frac{1}{u}\right)(u^2 + u)\right]^2} \quad (A.1)$$

In the rest of the proof, the following notation is used.

$$v_j = \ln(2) \frac{\ln\left(1 + \frac{1}{u}\right) q(u)}{\left[\ln^2\left(1 + \frac{1}{u}\right)(u^2 + u)\right]^2}$$

$$q(u) = 2 - (2u+1)\ln\left(1 + \frac{1}{u}\right)$$

Function q(u) has the following first and second order derivatives in u.

$$q'(u) = -2\ln\left(1 + \frac{1}{u}\right) + \frac{1}{u} + \frac{1}{u+1}$$

$$q''(u) = \frac{-1}{u^2(u+1)^2}$$

From the first equation above, $\lim_{u \to \infty} q'(u) = 0$. From the second equation, $q''(u) < 0$, $u > 0$, which implies that $q'(u)$ is strictly decreasing in u for $u > 0$. By these results, $q'(u) > 0$, $u > 0$. This proves $q(u)$ is strictly increasing in u for $u > 0$. The function $q(u)$ is negative for $u = 1.0$. At limit, the function has the property $$\lim_{u \to \infty} q(u) = 2 - \lim_{u \to \infty} \ln\left[\left(1 + \frac{1}{u}\right)^u \left(1 + \frac{1}{u}\right)^u \left(1 + \frac{1}{u}\right)\right] = 0.$$

As a result, $q(u) < 0$, $u > 0$. By definition of u, $u \geq c_{nj}$ which is a strictly positive number. Consequently the Hessian element in Equation (A.1) is well-defined and negative for all non-negative load vector $\rho$, as $v_j < 0$, $\forall j \in J_i$. Define vector $w_j = (b_{n1j}, \ldots, b_{n(n-1)j})^T$. The Hessian matrix equals $$\sum_{j \in J_i} \frac{v_j}{a_j} w_j w_j^T.$$

For any non-zero and real-numbered vector x of dimension n−1, $$x^T \left(\sum_{j \in J_i} \frac{v_j}{a_j} w_j w_j^T\right) x = \sum_{j \in J_i} \frac{v_j}{a_j} (w_j^T x)^T w_j^T x < 0.$$

This proves that the Hessian matrix is negative definite for all non-negative load vector $\rho$, and the function is strictly concave.

Proof of Property 2

For this proof, notation $u = U_{ij}(\rho)$ is used. The second ratio in the first-order partial derivative in Equation (5) equals the expression given below.

$$\frac{1}{u^2\left(1 + \frac{1}{u}\right)\ln\left(1 + \frac{1}{u}\right)\ln\left(1 + \frac{1}{u}\right)} =$$

$$\frac{1}{\ln\left(1 + \frac{1}{u}\right)^u \ln\left(1 + \frac{1}{u}\right)^u + \ln\left(1 + \frac{1}{u}\right)^u \ln\left(1 + \frac{1}{u}\right)}$$

When $\rho_k \to \infty$, the expression converges to one, because $$\lim_{u \to \infty} \ln\left(1 + \frac{1}{u}\right)^u = e$$

and u is linear in $\rho_k$. The result proves the property.

Proof of Property 3

Consider any load solution $\rho$ to the system. For cell i, $\rho_i = f_i(\rho_1, \ldots, \rho_{i-1}, \rho_{i+1}, \ldots, \rho_n)$. For any $\alpha \in (0,1)$, $f_i(\alpha(\rho_1, \ldots, \rho_{i-1}, \rho_{i+1}, \ldots, \rho_n)) = f_i(\alpha(\rho_1, \ldots, \rho_{i-1}, \rho_{i+1}, \ldots, \rho_n) + 0(1-\alpha) > \alpha f_i(\rho_1, \ldots, \rho_{i-1}, \rho_{i+1}, \ldots, \rho_n) + (1-\alpha) f_i(0)$ because of strict concavity (Property 1). Because $f_i(0) > 0$ and $\rho_i = f_i(\rho_1, \ldots, \rho_{i-1}, \rho_{i+1}, \ldots, \rho_n)$, it is proven that $f_i(\alpha(\rho_1, \ldots, \rho_{i-1}, \rho_{i+1}, \ldots, \rho_n)) > \alpha \rho_i$.

The next step of the proof uses contradiction. Suppose there are two different solutions $\rho^1$ and $\rho^2$. Let $$m = \arg\min_{i=1,\ldots,n} \frac{\rho_i^1}{\rho_i^2},$$

and $$\lambda = \frac{\rho_m^1}{\rho_m^2}.$$

Suppose first $\lambda < 1$. Then $\lambda \rho^2 \leq \rho^1$. Because the load function is strictly increasing in the domain of $\rho \geq 0$, $f_m(\lambda \rho^2) \leq f_m(\rho^1)$. By the result earlier in the proof, $\lambda \rho_m^2 < f_m(\lambda \rho^2)$. These inequalities lead to $\lambda \rho_m^2 < f_m(\rho^1)$. Because $f_m(\rho^1) = \rho_m^1$, the result contradicts the assumption $$\lambda = \frac{\rho_m^1}{\rho_m^2}.$$

Supposing $\lambda > 1$ and switching the roles of $\rho^1$ and $\rho^2$ gives a contradiction of the same type. As a result, $\lambda = 1$, and the Property is proven.

Proof of Property 4

For any cell i, the difference between $f_i(\rho)$ and the linear function defined for the cell is given by the following expression.

$$\sum_{j \in J_i} \left( \frac{1}{a_j \log_2\left(1 + \frac{1}{\sum_{k \in N: k \neq i} b_{ijk}\rho_k + c_{ij}}\right)} - \right.$$

$$\left. \frac{\ln(2)}{a_j} \sum_{k \in N: k \neq i} b_{ijk}\rho_k - \frac{1}{a_j \log_2\left(1 + \frac{1}{c_{ij}}\right)} \right)$$

Define $$v = \sum_{k \in N: k \neq i} b_{ijk}\rho_k.$$

As $a_j > 0$, proving the above expression is non-negative for each j is equivalent to the inequality below.

$$\frac{1}{\log_2\left(1 + \frac{1}{v + c_{ij}}\right)} - v\ln(2) =$$

$$\ln(2)\left(\frac{1}{\ln\left(1 + \frac{1}{v + c_{ij}}\right)} - v\right) \geq \frac{1}{\log_2\left(1 + \frac{1}{c_{ij}}\right)} = \frac{\ln(2)}{\ln\left(1 + \frac{1}{c_{ij}}\right)}$$

The inequality holds for $v = 0$. The next step is to prove $$\frac{1}{\ln\left(1 + \frac{1}{v + c_{ij}}\right)} - v$$

is increasing in v for $v \geq 0$. Consider the derivative of the expression in v. That the derivative is non-negative is equivalent to the following inequality, in which $u = v + c_{ij}$.

$$q(u) = u(u+1)\ln^2\left(1+\frac{1}{u}\right) \leq 1, \text{ for } u \geq c_{ij}. \quad (A.2)$$

Three facts apply to the expression given in (A.2). First, $\lim_{u\to 0^+} q(u)=0$, implying the existence of some positive u, $u \leq c_{ij}$, that satisfies (A.2). Second, $\lim_{u\to\infty} q(u)=1$. Third, $q'(u) \geq 0$ for $u>0$. The last fact is because $$q'(u) = \ln\left(1+\frac{1}{u}\right)\left((2u+1)\ln\left(1+\frac{1}{u}\right)-2\right),$$

in which the first term is positive, and the second term is proven to be positive in the proof of Property 1. By the three facts, q(u) grows monotonically from an arbitrary small positive number and converges to one at the limit. This proves the validity of (A.2).

Proof of Property 5

In the following, Property 5 is stated in two separate parts, necessary condition and sufficient condition, and a proof for each of the two parts is specified. Property 5.1 (necessary condition). If the load coupling system (4) has a solution, then the linear equation system (6) has also a solution.

Proof. By the assumption in Property 5.1, there exists a unique solution $\rho^*>0$ with $\rho^*=f(\rho^*)$. By Property 4, $H^0\rho^*+f(0) \leq \rho^*$. It implies that $\{H^0\rho+f(0) \leq \rho, \rho \geq 0\}$ is a non-empty set. Hence the linear programming optimization formulation $\{\min e^T\rho, H^0\rho+f(0) \leq \rho, \rho \geq 0\}$, where e is the column vector of ones of dimension n, admits at least one optimum. Any optimum to the optimization formulation must satisfy $H^0\rho+f(0) \leq \rho$ with equality, otherwise optimality is contradicted. Hence (6) has a solution. The uniqueness of the solution follows from the construction of the proof of Property 3, by which also $\rho=H^0\rho+f(0)$ has at most one solution in $R_+^n$.

Property 5.2 (sufficient condition). If the linear equation system (6) has a solution, then the load coupling system (4) has a solution.

By the assumption in Property 5.2, there exists $\rho^0>0$ with $\rho^0=H^0\rho^0+f(0)$. Let $\tilde\rho=\lambda\rho^0$, where $\lambda>1$ is a scalar. Then $\tilde\rho>H^0\tilde\rho+f(0)$. By this strict inequality, there exists a small real number $\epsilon>0$, such that inequality remains to hold, possibly with equality, if $\epsilon$ is added to all the non-diagonal elements of $H^0$, that is, $\tilde\rho \geq H^\epsilon\tilde\rho+f(0)$, where $H^\epsilon=H^0+\epsilon$. Hence $\beta\tilde\rho \geq \beta H^\epsilon\tilde\rho+f(0)$ for any scalar $\beta>1$. The next part of the proof compares the right-hand side of this inequality to the cell load function f for vector $\beta\tilde\rho$, when $\beta\to\infty$. For any cell i, the difference between the two functions, without the constant term $f_i(0)$, is given by the following expression.

$$\sum_{j\in J_i} \frac{\ln(2)}{a_j}\left[\sum_{k\in N, k\neq i} b_{ikj}\tilde\rho_k\beta - \frac{1}{\ln\left(1+\frac{1}{\sum_{k\in N, k\neq i} b_{ikj}\tilde\rho_k\beta + c_{ij}}\right)}\right] + \quad (A.3)$$

$$\left(\sum_{k\in N, k\neq i}\sum_{j\in J_i} \frac{\ln(2)b_{ikj}}{a_j}\tilde\rho_k\right)\beta$$

In (A.3), the β-dependent term within the brackets has the form $$b\beta - 1\Big/\left(1+\frac{1}{b\beta+c}\right),$$

where b and c are two positive constants. For this term, $$\lim_{\beta\to\infty} b\beta - 1\Big/\left(1+\frac{1}{b\beta+c}\right) = \frac{1}{2} - c.$$

The last term in (A.3) grows linearly in β. Hence (A.3) approaches infinity when $\beta\to\infty$. Consequently $$\lim_{\beta\to\infty} \sum_{k\in N, k\neq i} H_{ik}^\epsilon \beta\tilde\rho_k + f_i(0) - f_i(\beta\tilde\rho_k) \to \infty.$$

This proves the existence of $\tilde\beta>0$ with $\tilde\beta\tilde\rho \geq \tilde\beta H^\epsilon\tilde\rho+f(0)>f(\tilde\beta\tilde\rho)$. Hence the set $\{f(\rho) \geq \rho, 0 \leq \rho \leq \tilde\beta\tilde\rho\}$ is non-empty. By construction, this set is compact. Hence the optimization problem defined as $\{\min e^T\rho, f(\rho) \geq \rho, 0 \leq \rho \leq \tilde\beta\tilde\rho\}$, where e is the column vector of ones of dimension n, has at least one optimal solution by Weierstrass theorem in optimization theory. Any optimum to the problem must satisfy $f(\rho)=\rho$, otherwise optimality is contradicted. Hence it is proved that the cell load coupling system has a solution.

The invention claimed is:

1. A method for use in determining a coupling characteristic in a radio communications network comprising a plurality of cells, including a plurality of radio network nodes associated with the cells, the method comprising:
   a network node processor determining a cell load coupling characteristic between a first and second of the plurality of cells, the determining being based on one or more reports received over the radio communications network, the one or more reports including a cell load contribution that is dependent on:
   a measurement of a signal received by a wireless communication device of the first cell from a transmitting radio network node of the first cell;
   a measurement of a signal received by the wireless communication device of the first cell from a transmitting radio network node of the second cell; and
   a measurement of traffic between the wireless communication device and the transmitting radio network node of the first cell,
   wherein the measurement of traffic comprises a product of the total number of resource units and bandwidth per resource unit of the first cell divided by the traffic demand for the first cell.

2. The method of claim 1, wherein:
   the signal measurement comprises respective absolute or relative received power levels of the signals; and
   the measurement of traffic comprises traffic demand, a quality of service demand, a user subscription rate, a bearer service rate, target bitrate, maximum bitrate, or a relationship between a traffic demand of a wireless communication device served by the first cell and one or more resources of the first cell.

3. The method of claim 1, wherein the network node processor is included in a radio network controller (RNC), a self-organizing network (SON) node, or an operations and maintenance (O&M) node.

4. The method of claim 1, wherein the cell load contribution is an aggregate component reflecting contributions of multiple user equipment devices or bearers.

5. The method of claim 1, further comprising: signaling the cell load coupling characteristic to another network node.

6. The method of claim 1, further comprising:
   collecting respective cell load coupling characteristics for couples of the plurality of cells.

7. The method of claim 1, further comprising performing one or more of the following operations based on the determined cell load coupling characteristics: neighbor cell evaluation, QoS evaluation and control, load estimation, load prediction, load balancing, capacity estimation, inter-cell interference coordination, handover, cell range control, admission control, congestion control, or radio network configuration evaluation.

8. The method of claim 1, further comprising performing one or more of the following operations based on the determined cell load coupling characteristics:
   optimizing a heterogeneous network deployment, by using the cell load coupling characteristic for optimizing cell configuration, optimizing transmit points configuration, or optimizing receive points configuration; or
   creating a neighbor categorization, wherein creating the neighbor categorization comprises: identifying, based on one or more cell load coupling characteristics, a first group of the plurality of cells that significantly impact the first cell and a second group of the plurality of cells that do not significantly impact the first cell; or
   making a single-cell radio-resource utilization decision for the first cell, wherein making the single-cell decision comprises: using the cell load coupling characteristic to evaluate a single-cell change due to an event for the first cell, comparing the single-cell change to a threshold, and adopting or rejecting the single-cell change dependent on the comparing to the threshold; or
   making a multi-cell radio-resource utilization decision for two or more of the plurality of cells, wherein the multi-cell radio-resource utilization decision comprises one or more of: intra-frequency handover, cell range optimization, load balancing, reconfiguration of a multi-leg connection on the same frequency, inter-cell interference coordination, or radio network planning and optimization actions.

9. The method of claim 1, further comprising:
determining a cell load coupling matrix.

10. The method of claim 9, wherein the cell load coupling matrix is used for one or more of:
   calculating a cell load of one or more of a plurality of cells of the wireless communication network;
   estimating the existence of a load solution;
   estimating the feasibility of a network configuration; or
   performing at least one or more network management functions.

11. The method of claim 9, wherein the determining is based on one or more of the following cell-load coupling system properties: (1) concavity, (2) asymptotic rate of load growth; (3) uniqueness of the load solution; (4) lower bounding; (5) existence of the load solution; and (6) upper bounding.

12. The method of claim 1, further comprising performing one or more network management functions on the radio communications network based on the determined cell load coupling characteristics, wherein the performing the one or more network management functions is dependent on one or more of the following cell-load coupling system properties: (1) concavity, (2) asymptotic rate of load growth; (3) uniqueness of the load solution; (4) lower bounding; (5) existence of the load solution; and (6) upper bounding.

13. The method of claim 12, wherein the performing the one or more network management functions is further dependent on (7) a solution existence for a constrained cell-load coupling system.

14. The method of claim 1, further comprising, based on the determined cell load coupling characteristics:
   optimizing a heterogeneous network deployment, by using the cell load coupling characteristic for optimizing cell configuration, optimizing transmit points configuration, or optimizing receive points configuration.

15. The method of claim 1, further comprising performing, based on the determined cell load coupling characteristics:
   creating a neighbor categorization, wherein creating the neighbor categorization comprises: identifying, based on one or more cell load coupling characteristics, a first group of the plurality of cells that significantly impact the first cell and a second group of the plurality of cells that do not significantly impact the first cell.

16. The method of claim 1, further comprising performing, based on the determined cell load coupling characteristics:
   making a single-cell radio-resource utilization decision for the first cell, wherein making the single-cell decision comprises: using the cell load coupling characteristic to evaluate a single-cell change due to an event for the first cell, comparing the single-cell change to a threshold, and adopting or rejecting the single-cell change dependent on the comparing to the threshold.

17. The method of claim 1, further comprising performing, based on the determined cell load coupling characteristics:
   making a multi-cell radio-resource utilization decision for two or more of the plurality of cells, wherein the multi-cell radio-resource utilization decision comprises one or more of: intra-frequency handover, cell range optimization, load balancing, reconfiguration of a multi-leg connection on the same frequency, inter-cell interference coordination, or radio network planning and optimization actions.

18. An apparatus for use in a radio communications network, the apparatus comprising:
   a processor configured to use a cell load contribution to determine a cell load coupling characteristic between a first and second of a plurality of cells of a radio communications network, wherein the cell load contribution depends on:
   a measurement of a signal received by a wireless communication device of the first cell from a transmitting radio network node of the first cell;
   a measurement of a signal received by the wireless communication device from a transmitting radio network node of the second cell; and
   a measurement of traffic between the wireless communication device and the transmitting radio network node of the first cell,
   wherein the measurement of traffic comprises a product of the total number of resource units and bandwidth per resource unit of the first cell divided by the traffic demand for the first cell.

19. The apparatus of claim 18, wherein:
   the signal measurement comprises respective power levels of the signals; and
   the measurement of traffic comprises traffic demand, a quality of service demand a user subscription rate, a bearer service rate, target bitrate, maximum bitrate, or a relationship between a traffic demand of a wireless communication device served by the first cell and one or more resources of the first cell.

20. The apparatus of claim 18, wherein the apparatus is a component of a radio base station, a radio network controller (RNC), a self-organizing network (SON) node, or an operations and maintenance (O&M) node.

21. The apparatus of claim 18, wherein the cell load contribution comprises an aggregate component reflecting contributions of multiple user equipment devices or bearers.

22. The apparatus of claim 18, wherein the processor is further configured to signal the cell load coupling characteristic to another network node.

23. The apparatus of claim 18, wherein the processor is further configured to collect respective cell load coupling characteristics for couples of the plurality of cells.

24. The apparatus of claim 18, wherein the processor is further configured to perform one or more of the following operations based on the determined cell load coupling characteristics: neighbor cell evaluation, QoS evaluation and control, load estimation, load prediction, load balancing, capacity estimation, inter-cell interference coordination, handover, admission control, congestion control, or radio network configuration evaluation.

25. The apparatus of claim 18, wherein the processor is further configured to perform one or more of the following operations based on the determined cell load coupling characteristics:
   optimizing a heterogeneous network deployment, by using the cell load coupling characteristic for optimizing cell configuration, optimizing transmit points configuration, or optimizing receive points configuration; or
   creating a neighbor categorization, wherein creating the neighbor categorization comprises: identifying, based on one or more cell load coupling characteristics, a first group of the plurality of cells that significantly impact the first cell and a second group of the plurality of cells that do not significantly impact the first cell; or
   making a single-cell radio-resource utilization decision for the first cell, wherein making the single-cell decision comprises: using the cell load coupling characteristic to evaluate a single-cell change due to an event for the first cell, comparing the single-cell change to a threshold, and adopting or rejecting the single-cell change dependent on the comparing to the threshold; or
   making a multi-cell radio-resource utilization decision for two or more of the plurality of cells, wherein the multi-cell radio-resource utilization decision comprises one or more of: intra-frequency handover, cell range optimization, load balancing, reconfiguration of a multi-leg connection on the same frequency, inter-cell interference coordination, or radio network planning and optimization actions.

26. The apparatus of claim 25, wherein the performing the one or more operations is dependent on one or more cell-load coupling system properties chosen from: (1) asymptotic rate of load growth; (2) uniqueness of the load solution; (3) lower bounding; (4) existence of the load solution; (5) upper bounding; (6) concavity.

27. The apparatus of claim 26, wherein the performing the one or more operations is further dependent on (7) a solution existence for a constrained cell-load coupling system.

28. A non-transitory computer-readable storage medium storing program instructions executable by a processor operating in a network including a plurality of radio network nodes associated with the cells, wherein the instructions are configured to cause the processor to:
   determine a cell load coupling characteristic between a first and second of the plurality of cells, the determining being based on a cell load contribution that is dependent on:
   a measurement of a signal received by a wireless communication device of the first cell from a transmitting radio network node of the first cell;
   a measurement of a signal received by the wireless communication device from a transmitting radio network node of the second cell; and
   a measurement of traffic between the wireless communication device and the transmitting radio network node of the first cell,
   wherein the measurement of traffic comprises a product of the total number of resource units and bandwidth per resource unit of the first cell divided by the traffic demand for the first cell.

29. The non-transitory computer-readable medium of claim 28, wherein the instructions are further configured to cause the processor to determine a cell load coupling matrix.

30. The non-transitory computer-readable medium of claim 28, wherein the instructions are further configured to cause the processor to perform one or more network management functions on the radio communications network based on the determined cell load coupling characteristics.

31. The non-transitory computer-readable medium of claim 28, wherein the one or more network management functions comprises any one or more of:
   optimizing a heterogeneous network deployment, by using the cell load coupling characteristic for optimizing cell configuration, optimizing transmit points configuration, or optimizing receive points configuration; or
   creating a neighbor categorization, wherein creating the neighbor categorization comprises: identifying, based on one or more cell load coupling characteristics, a first group of the plurality of cells that significantly impact the first cell and a second group of the plurality of cells that do not significantly impact the first cell; or
   making a single-cell radio-resource utilization decision for the first cell, wherein making the single-cell decision comprises: using the cell load coupling characteristic to evaluate a single-cell change due to an event for the first cell, comparing the single-cell change to a threshold, and adopting or rejecting the single-cell change dependent on the comparing to the threshold; or
   making a multi-cell radio-resource utilization decision for two or more of the plurality of cells, wherein the multi-cell radio-resource utilization decision comprises one or more of: intra-frequency handover, cell range optimization, load balancing, reconfiguration of a multi-leg connection on the same frequency, inter-cell interference coordination, or radio network planning and optimization actions.

* * * * *